US012177175B2

(12) United States Patent
Jonik et al.

(10) Patent No.: US 12,177,175 B2
(45) Date of Patent: Dec. 24, 2024

(54) MUTUAL AFFINITY WIDGET

(71) Applicant: Snap Inc., Santa Monica, CA (US)

(72) Inventors: Daniel Jonik, Seattle, WA (US); Daniel Moreno, Los Angeles, CA (US); Yu Wang, Mill Valley, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/050,869

(22) Filed: Oct. 28, 2022

(65) Prior Publication Data

US 2024/0039878 A1 Feb. 1, 2024

Related U.S. Application Data

(60) Provisional application No. 63/369,998, filed on Aug. 1, 2022.

(51) Int. Cl.
H04L 51/21 (2022.01)
(52) U.S. Cl.
CPC .................. H04L 51/21 (2022.05)
(58) Field of Classification Search
None
See application file for complete search history.

(56) References Cited

U.S. PATENT DOCUMENTS

| 10,419,375 | B1 * | 9/2019 | Sokolov | H04L 51/212 |
| 10,908,803 | B1 * | 2/2021 | Fieldman | G06F 3/147 |
| 2011/0009103 | A1 | 1/2011 | Do | |
| 2013/0059606 | A1 * | 3/2013 | Pujol | H04W 4/023 455/456.3 |
| 2013/0097535 | A1 | 4/2013 | Liu et al. | |
| 2015/0256596 | A1 * | 9/2015 | Takeuchi | H04L 67/53 715/748 |
| 2018/0046333 | A1 | 2/2018 | Klassen et al. | |
| 2018/0069828 | A1 | 3/2018 | Kim et al. | |

(Continued)

FOREIGN PATENT DOCUMENTS

WO  WO-2024030795 A1  2/2024

OTHER PUBLICATIONS

Xiao et al., "IconIntent: Automatic Identification of Sensitive UI Widgets Based on Icon Classification for Android Apps", May 1, 2019, IEEE, 2019 IEEE/ACM 41st International Conference on Software Engineering (ICSE) (2019, pp. 257-268) (Year: 2019).*

(Continued)

Primary Examiner — Davoud A Zand
(74) Attorney, Agent, or Firm — Schwegman Lundberg & Woessner, P.A.

(57) ABSTRACT

An interaction system that provides users in mutual affinity relationships to send messages. Interaction applications of two or more users receives notifications of a mutual affinity relationship between the first user and the second user. The interaction applications configure respective mutual affinity widgets by associating the mutual affinity widget with the respective other user. Icons of the mutual affinity widgets are provided on respective home screens of the users. Upon detecting a selection of the mutual affinity widget by a first user, a message creation interface is provided to the first user and a message is generated based on an image captured by the first user using the message creation user interface. The message is then sent to a second user. The second user uses their own mutual affinity widget to access the message.

20 Claims, 22 Drawing Sheets

(56) References Cited

U.S. PATENT DOCUMENTS

| | | | | |
|---|---|---|---|---|
| 2018/0335928 A1* | 11/2018 | Van Os | ................ | G06Q 20/204 |
| 2020/0045245 A1 | 2/2020 | Van Os et al. | | |
| 2020/0412864 A1* | 12/2020 | Al Majid | ................ | H04L 51/10 |
| 2021/0097745 A1* | 4/2021 | Monroy-Hernández | .................... | |
| | | | | H04L 51/52 |
| 2022/0317830 A1* | 10/2022 | Skuratowicz | ......... | G06F 3/0482 |
| 2022/0362631 A1* | 11/2022 | Hong | ..................... | A61B 5/744 |
| 2023/0096334 A1* | 3/2023 | Al Majid | ................ | H04L 51/21 |
| | | | | 715/863 |

OTHER PUBLICATIONS

"International Application Serial No. PCT/US2023/071005, International Search Report mailed Nov. 7, 2023", 3 pgs.
"International Application Serial No. PCT/US2023/071005, Written Opinion mailed Nov. 7, 2023", 4 pgs.

* cited by examiner

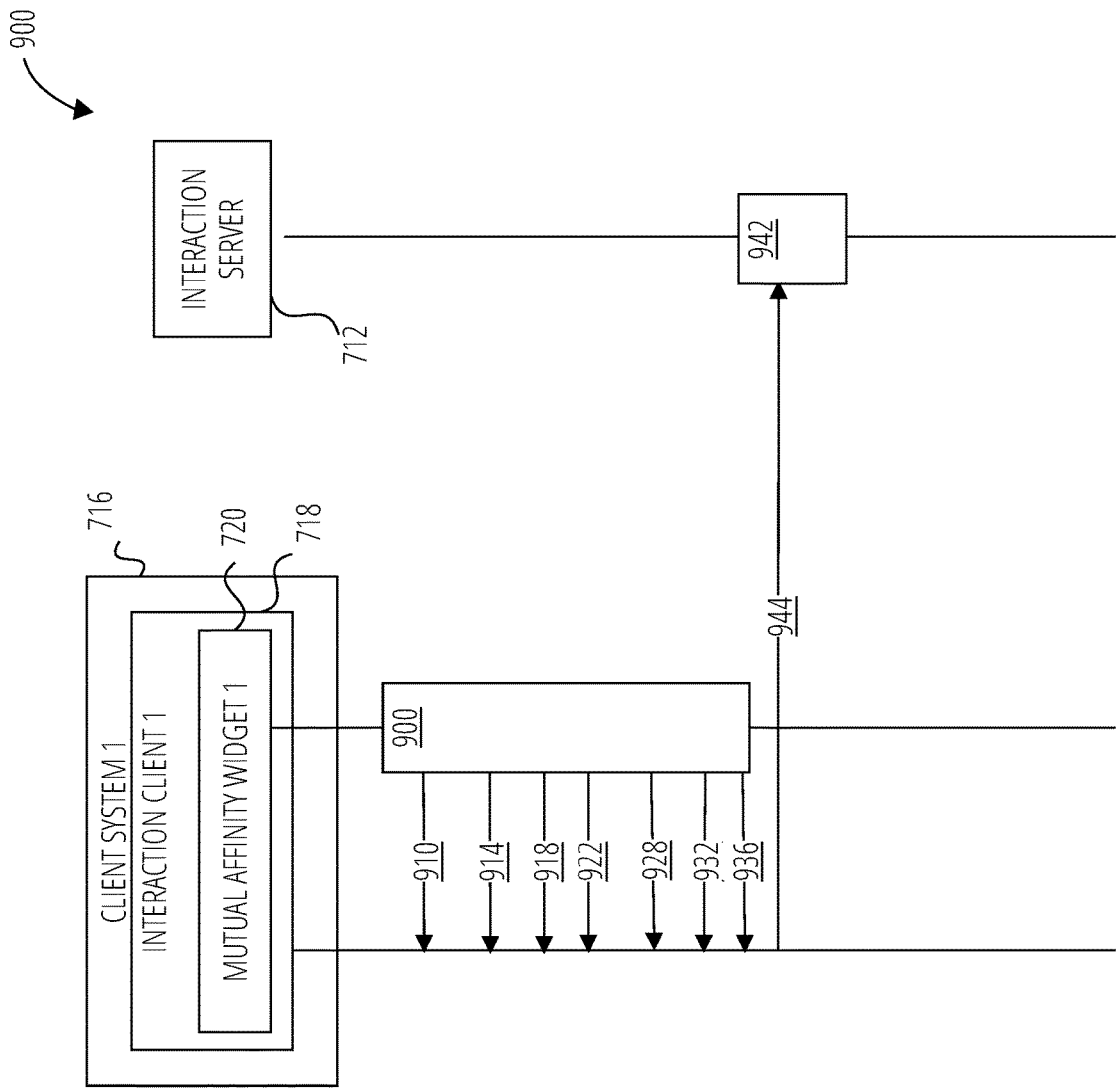

MUTUAL AFFINITY WIDGET

CLAIM OF PRIORITY

This application claims the benefit of priority to U.S. Provisional Application Ser. No. 63/369,998, filed Aug. 1, 2022, which is incorporated herein by reference in its entirety.

TECHNICAL FIELD

The present disclosure relates generally to user interfaces and more particularly to user interfaces used for social networking.

BACKGROUND

Users enjoy accessing social networking content using mobile devices such as smartphones. The use of mobile devices allows users to spontaneously share moments with others while also enjoying being out in the community and engaging in various activities. Mobile devices use touchscreens with limited surface areas as both display devices and input devices which restricts content viewing as well as user interactions with that content. Therefore, convenient processes for accessing social networking content are desirable.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 9C is a sequence diagram of a create message method, according to some examples.

DETAILED DESCRIPTION

Figure 1:
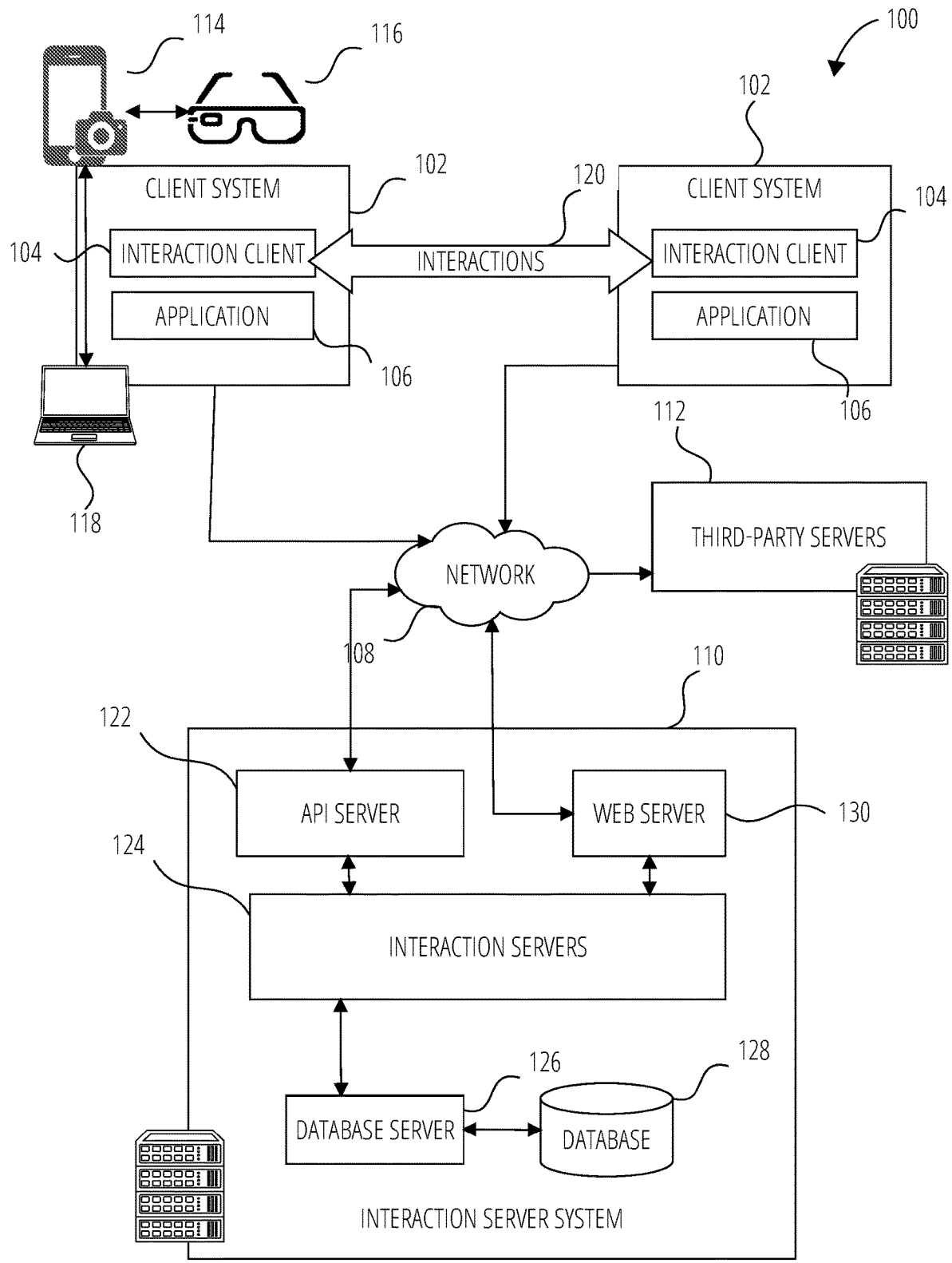
FIG. 1 is a diagrammatic representation of a networked environment in which the present disclosure may be deployed, according to some examples.

Users of social networking systems develop relationships with other users. Some of these relationships are casual, and it is possible for users in these casual relationships to rarely exchange messages. Some relationships are one-sided where one user may send more messages to another user who rarely messages back or sends more messages to other users. However, some users also develop mutually strong relationships where each user in the relationship sends messages mostly to the other users in the mutual relationship. Some users in these mutual relationships exchange messages frequently and a convenient method for sending and receiving messages to another user in a mutual relationship is desirable.

Many software applications have extensive functions or features that are accessed by users of the software applications through various user interfaces. The more features a software application has, the more user interfaces are provided to users. Some user interfaces may have extensive or deep dialogs that require a number of user interactions before a user finds and accesses a particular feature or function. Sometimes, a user may want to perform a particular set of operations using a software application, but the features of the software application that are used to perform those operations may be spread across several user interfaces or may be in different dialog branches of the same user interface.

Examples of the present disclosure provide a methodology for providing a message sender with a quick and easy way to send a message to a message receiver of a social networking system using an interaction client without having to invoke the interaction application explicitly from a home screen of a client system hosting the interaction application. In addition, the message sender and the message receiver access additional features of the interaction application using an abbreviated user interface. This reduces a number and complexity of user interactions with the interaction client as compared to invoking the interaction client directly and accessing multiple user interfaces and dialogs to send and receive messages to and from a unique user.

In some examples, a mutual affinity widget displayed on a message sender's client system provides a convenient way to send and receive image-based messages with a message receiver with whom the message sender has a mutual affinity. Social networking information is used to identify and notify users who are in a mutual affinity relationship. When notified, the users configure their respective mutual affinity widgets by associating their mutual affinity widgets with the other user. The mutual affinity widgets are configured, and a mutual affinity widget icon is displayed on a home screen of a respective client system such as a smartphone. A user selects the mutual affinity widget icon and is provided with a specialized user interface that can be used to quickly capture images, augment the images, and then send them to the other user as mutual affinity messages. A client system of a message receiver of the mutual affinity message receives the mutual affinity message and displays a portion of the mutual affinity message in the mutual affinity icon on the message receiver's home screen. The message receiver selects the mutual affinity icon, and the client system provides the mutual affinity message in a user interface that provides options for replying to the sender of the mutual affinity message.

In some examples, a message receiver of the mutual affinity message replies by sending their own mutual affinity message.

In some examples, a message receiver of the mutual affinity message enters into a conversation with the sender of the mutual affinity message.

In some examples, a sender of a mutual affinity message augments an image of the mutual affinity message before the mutual affinity message is sent to the message receiver of the mutual affinity message.

In some examples, the mutual affinity widget includes a status indicator that indicates that a message has been sent.

In some examples, the mutual affinity widget displays to the message receiver a portion of the message thus alerting the message receiver that they have a message from the message sender.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other client systems 102), an interaction server system 110 and third-party servers 112). An interaction client 104 can also communicate with locally hosted applications 106 using Applications Program Interfaces (APIs).

Each client system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a client system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a client system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the client system 102 (e.g., a "native app"), or a small-scale version of the application (e.g., an "applet") that is hosted on the client system 102 or remote of the client system 102

(e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .ml file), an applet may incorporate a scripting language (e.g., a .js file or a .json file) and a style sheet (e.g., a .ss file).

In response to receiving a user selection of the option to launch or access features of the external resource, the interaction client 104 determines whether the selected external resource is a web-based external resource or a locally installed application 106. In some cases, applications 106 that are locally installed on the client system 102 can be launched independently of and separately from the interaction client 104, such as by selecting an icon corresponding to the application 106 on a home screen of the client system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally installed application 106, the interaction client 104 instructs the client system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the client system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
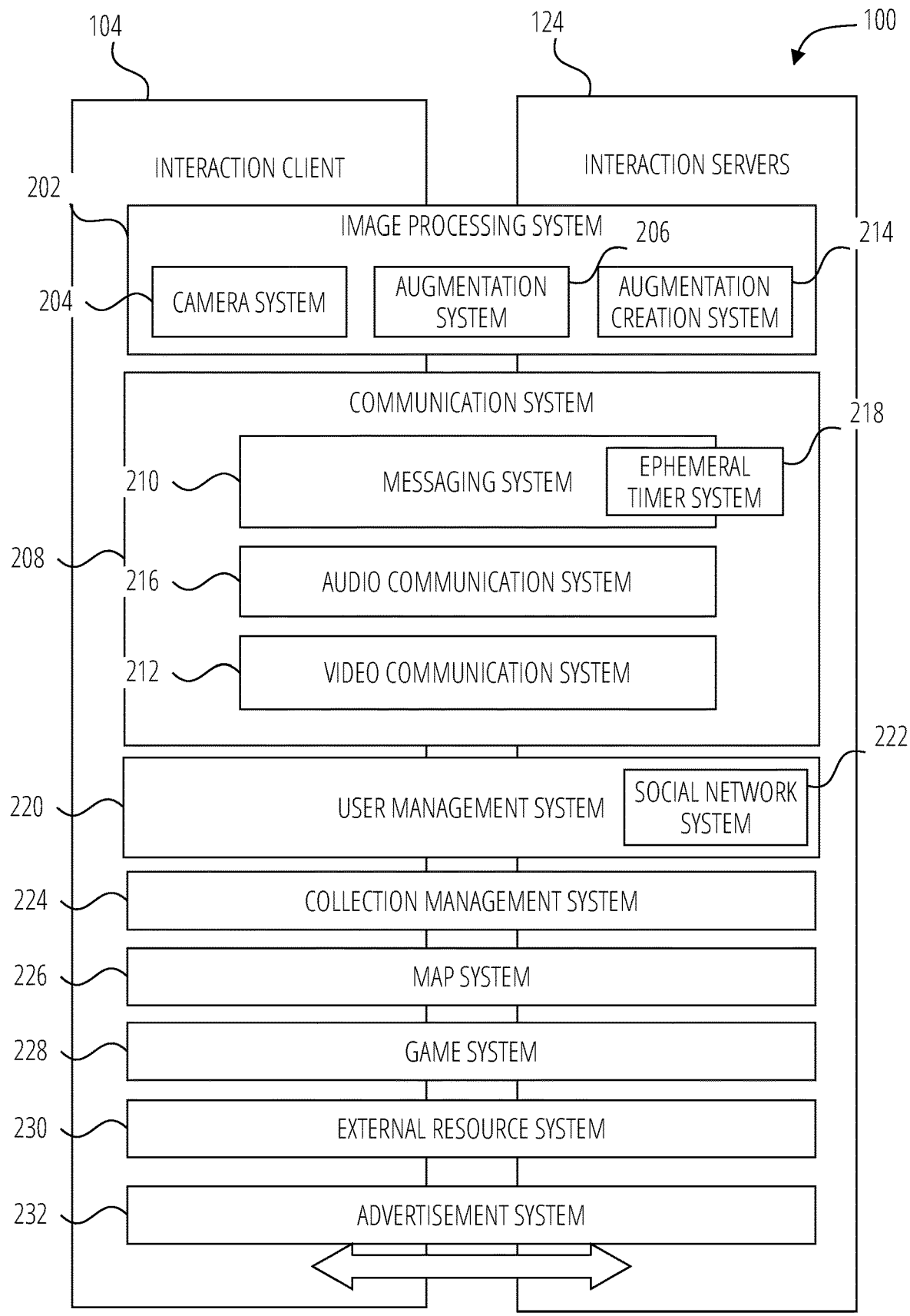
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., augment or otherwise modify or edit) media content associated with a message.

A camera system 204 includes control software (e.g., in a camera application) that interacts with and controls hardware camera hardware (e.g., directly or via operating system controls) of the client system 102 to modify and augment real-time images captured and displayed via the interaction client 104.

The augmentation system 206 provides functions related to the generation and publishing of augmentations (e.g., media overlays) for images captured in real-time by cameras of the client system 102 or retrieved from memory of the client system 102. For example, the augmentation system 206 operatively selects, presents, and displays media overlays (e.g., an image filter or an image lens) to the interaction client 104 for the augmentation of real-time images received via the camera system 204 or stored images retrieved from memory 602 of a client system 102. These augmentations are selected by the augmentation system 206 and presented to a user of an interaction client 104, based on a number of inputs and data, such as for example:

Geolocation of the client system 102; and

Social network information of the user of the client system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at client system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the client system 102 or a video stream produced by the client system 102. In some examples, the media overlay may be a location overlay (e.g., Venice beach), a name of a live event, or a name of a merchant overlay (e.g., Beach Coffee House). In further examples, the image processing system 202 uses the geolocation of the client system 102 to identify a media overlay that includes the name of a merchant at the geolocation of the client system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles and includes a social network system 222 that maintains social network information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a client system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Data Architecture

Figure 3:
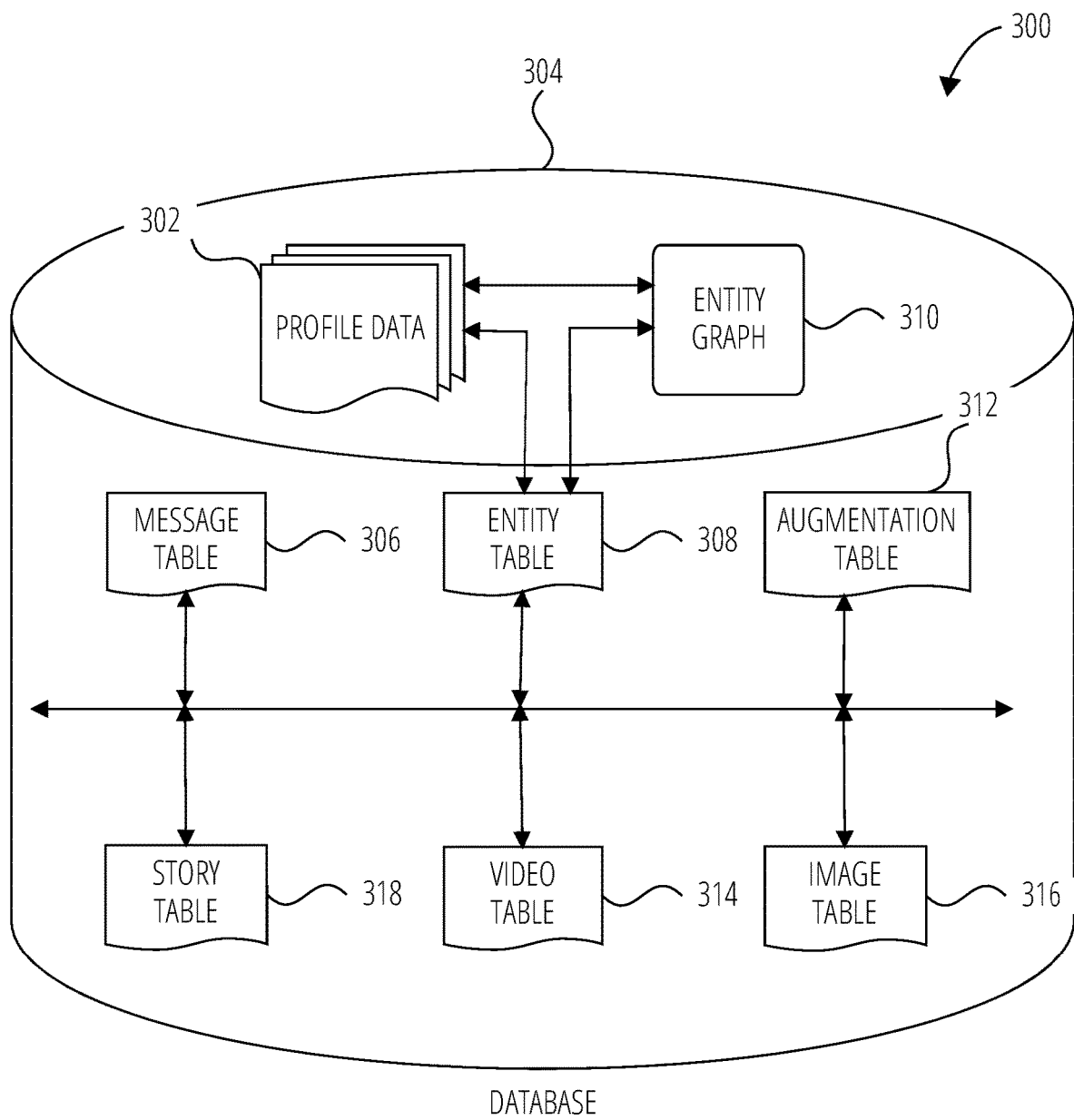
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100 or may selectively be applied to only certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a message receiver. Filters may be of various types, including user-selected filters from a set of filters presented to a message sender by the interaction client 104 when the message sender is composing a message. Other types of filters include geolocation filters (also known as geo-filters), which may be presented to a message sender based on geographic location. For example, geolocation filters specific to a neighborhood or special location may be presented within a user interface by the interaction client 104, based on geolocation information determined by a Global Positioning System (GPS) unit of the client system 102.

Another type of filter is a data filter, which may be selectively presented to a message sender by the interaction client 104 based on other inputs or information gathered by the client system 102 during the message creation process. Examples of data filters include current temperature at a specific location, a current speed at which a message sender is traveling, battery life for a client system 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality (AR), virtual reality (VR) and mixed reality (MR) content items, overlays, image transformations, images, and modifications that may be applied to image data (e.g., videos or images). This includes real-time modifications, which modify an image as it is captured using device sensors (e.g., one or multiple cameras) of the client system 102 and then displayed on a screen of the client system 102 with the modifications. This also includes modifications to stored content, such as video clips in a collection or group that may be modified. For example, in a client system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a client system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the client system 102) and perform complex image manipulations locally on the client system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client system 102.

In some examples, a computer animation model to transform image data can be used by a system where a user may capture an image or video stream of the user (e.g., a selfie) using the client system 102 having a neural network operating as part of an interaction client 104 operating on the client system 102. The transformation system operating within the interaction client 104 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client system 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a message sender to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose client system 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include social network information collected by the social network system 222. The social network information includes mutual affinity relationship data for users. The mutual affinity relationship data can be used to group two or more users in a mutual affinity relationship and offer additional functionality of the interaction system 100.

Data Communications Architecture

Figure 4:
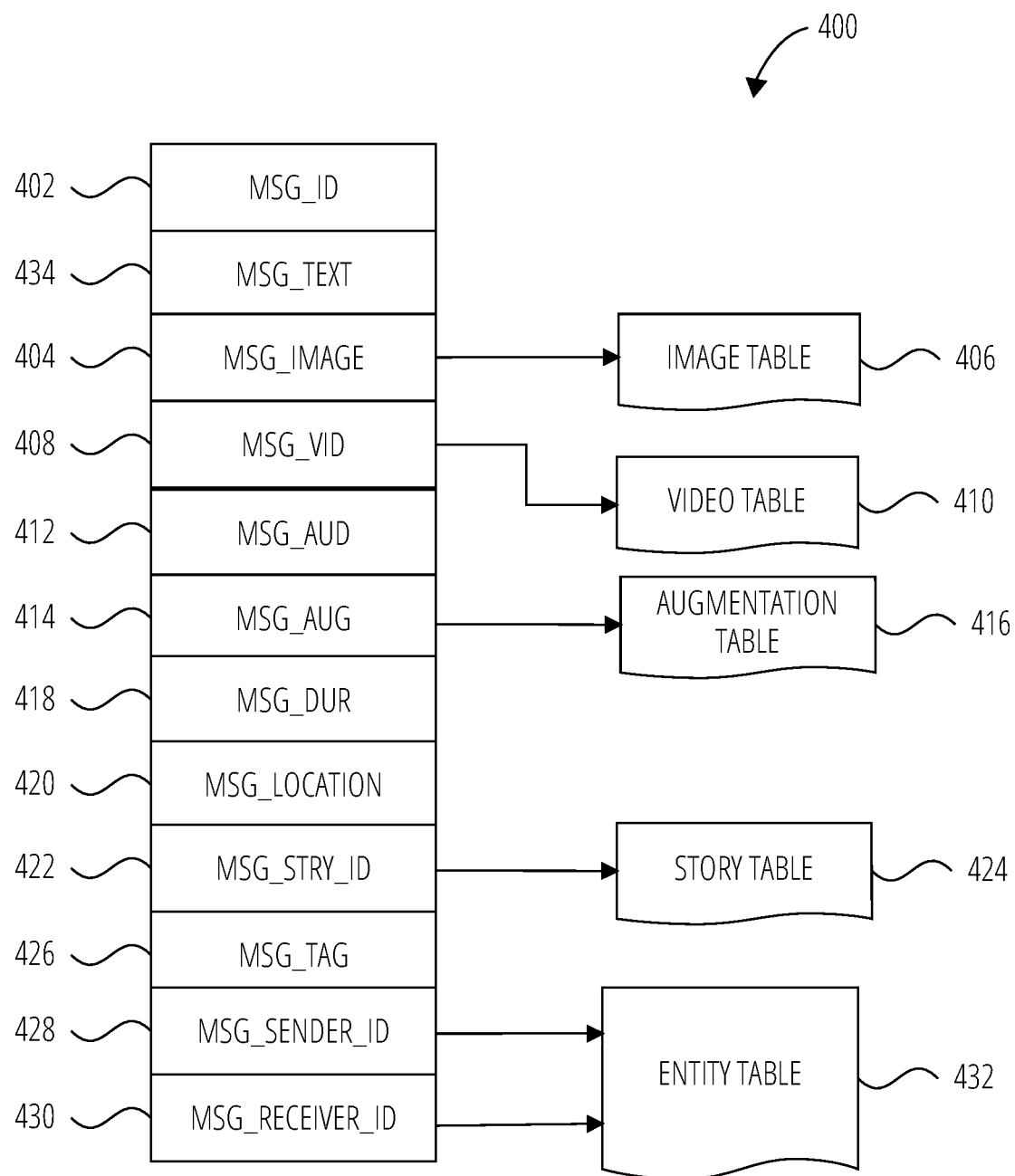
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the client system 102 or the interaction servers 124. A message 400 is shown to include the following example components:

Message identifier 402: a unique identifier that identifies the message 400.

Message text payload 434: text, to be generated by a user via a user interface of the client system 102, and that is included in the message 400.

Message image payload 404: image data, captured by a camera component of a client system 102 or retrieved from a memory component of a client system 102, and that is included in the message 400. Image data for a sent or received message 400 may be stored in the image table 406.

Message video payload 408: video data, captured by a camera component or retrieved from a memory component of the client system 102, and that is included in the message 400. Video data for a sent or received message 400 may be stored in the video table 410.

Message audio payload 412: audio data, captured by a microphone or retrieved from a memory component of the client system 102, and that is included in the message 400.

Message augmentation data 414: augmentation data (e.g., filters, stickers, or other annotations or enhancements) that represents augmentations to be applied to message image payload 404, message video payload 408, or message audio payload 412 of the message 400. Augmentation data for a sent or received message 400 may be stored in the augmentation table 416.

Message duration parameter 418: parameter value indicating, in seconds, the amount of time for which content of the message (e.g., the message image payload 404, message video payload 408, message audio payload 412) is to be presented or made accessible to a user via the interaction client 104.

Message geolocation parameter 420: geolocation data (e.g., latitudinal and longitudinal coordinates) associated with the content payload of the message. Multiple message geolocation parameter 420 values may be included in the payload, each of these parameter values being associated with respect to content items included in the content (e.g., a specific image within the message image payload 404, or a specific video in the message video payload 408).

Message story identifier 422: identifier values identifying one or more content collections (e.g., "stories" identified in the story table 424) with which a particular content item in the message image payload 404 of the message 400 is associated. For example, multiple images within the message image payload 404 may each be associated with multiple content collections using identifier values.

Message tag 426: each message 400 may be tagged with multiple tags, each of which is indicative of the subject matter of content included in the message payload. For example, where a particular image included in the message image payload 404 depicts an animal (e.g., a lion), a tag value may be included within the message tag 426 that is indicative of the relevant animal. Tag values may be generated manually, based on user input, or may be automatically generated using, for example, image recognition.

Message sender identifier 428: an identifier (e.g., a messaging system identifier, email address, or device identifier) indicative of a user of the client system 102 on which the message 400 was generated and from which the message 400 was sent.

Message receiver identifier 430: an identifier (e.g., a messaging system identifier, email address, or device identifier) indicative of a user of the client system 102 to which the message 400 is addressed.

The contents (e.g., values) of the various components of message 400 may be pointers to locations in tables within which content data values are stored. For example, an image value in the message image payload 404 may be a pointer to (or address of) a location within an image table 406. Similarly, values within the message video payload 408 may point to data stored within a video table 410, values stored within the message augmentation data 418 may point to data stored in an augmentation table 416, values stored within the message story identifier 422 may point to data stored in a story table 424, and values stored within the message sender identifier 428 and the message receiver identifier 430 may point to user records stored within an entity table 432.

Time-Based Access Limitation Architecture

Figure 5:
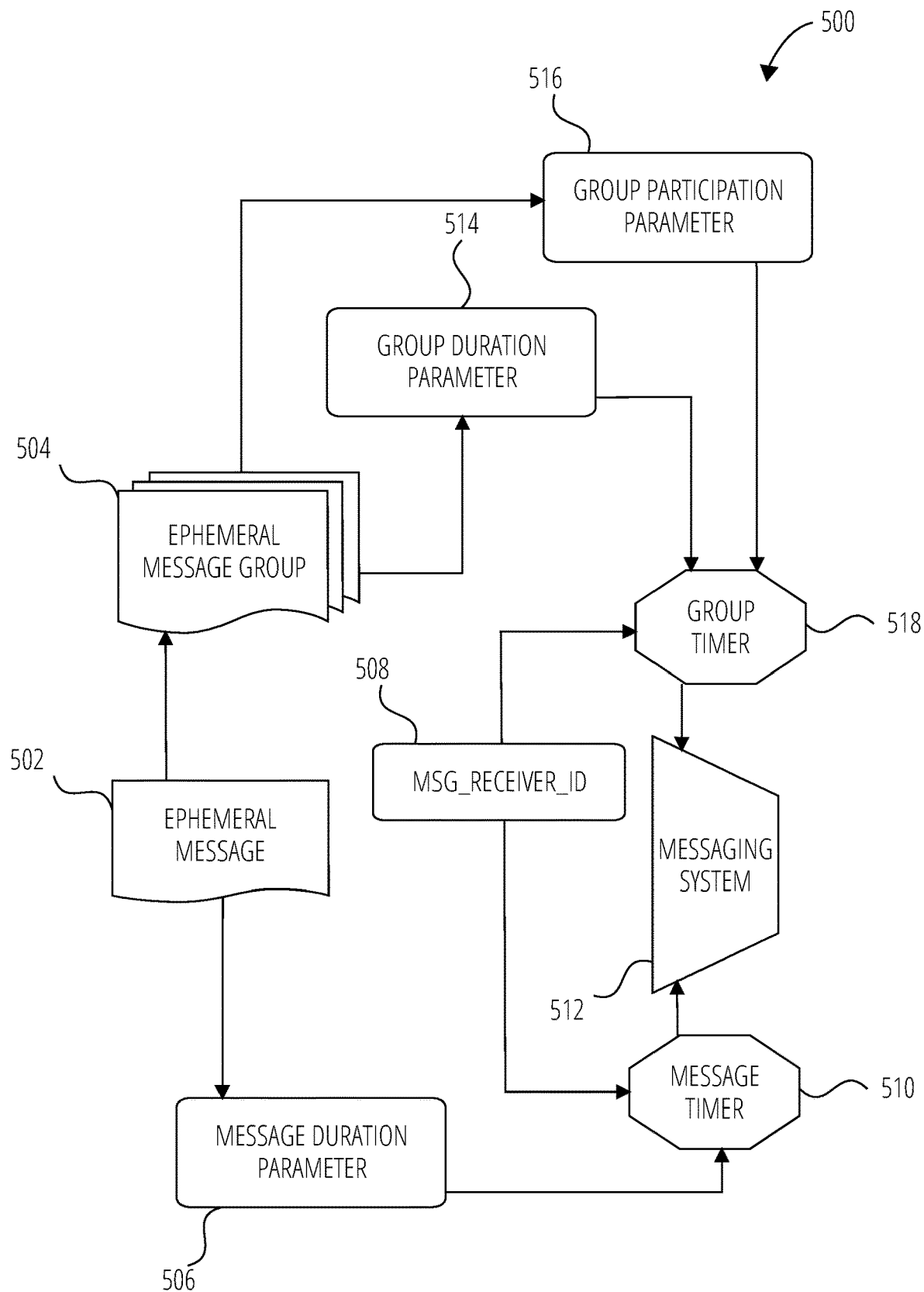
FIG. 5 is a flowchart for an access-limiting process, according to some examples.

FIG. 5 is a schematic diagram illustrating an access-limiting process 500, in terms of which access to content (e.g., an ephemeral message 502 and associated multimedia payload of data) or a content collection (e.g., an ephemeral message group 504) may be time-limited (e.g., made ephemeral).

An ephemeral message 502 is shown to be associated with a message duration parameter 506, the value of which determines the amount of time that the ephemeral message 502 will be displayed to a receiving user of the ephemeral message 502 by the interaction client 104. In some examples, an ephemeral message 502 is viewable by a receiving user for up to a maximum of 10 seconds, depending on the amount of time that the message sender specifies using the message duration parameter 506.

The message duration parameter 506 and the message receiver identifier 508 are shown to be inputs to a message timer 510, which is responsible for determining the amount of time that the ephemeral message 502 is shown to a particular receiving user identified by the message receiver identifier 508. In particular, the ephemeral message 502 will be shown to the relevant receiving user for a time period determined by the value of the message duration parameter 506. The message timer 510 is shown to provide output to a more generalized messaging system 512, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 514, a value of which determines a time duration for which the ephemeral message group 504 is presented and accessible to users of the interaction system 100. The group duration parameter 514, for example, may be the duration of a music concert, where the ephemeral message group 504 is a collection of content pertaining to that concert. Alternatively, a user (either the owning user or a curator user) may specify the value for the group duration parameter 514 when performing the setup and creation of the ephemeral message group 504.

Additionally, each ephemeral message 502 within the ephemeral message group 504 has an associated group participation parameter 516, a value of which determines the duration of time for which the ephemeral message 502 will be accessible within the context of the ephemeral message group 504. Accordingly, a particular ephemeral message group 504 may "expire" and become inaccessible within the context of the ephemeral message group 504 prior to the ephemeral message group 504 itself expiring in terms of the group duration parameter 514. The group duration parameter 514, group participation parameter 516, and message receiver identifier 508 each provide input to a group timer 518, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 508.

Accordingly, the group timer 518 operationally controls the overall lifespan of an associated ephemeral message group 504 as well as an individual ephemeral message 502 included in the ephemeral message group 504. In some examples, each and every ephemeral message 502 within the ephemeral message group 504 remains viewable and accessible for a time period specified by the group duration parameter 514. In a further example, a certain ephemeral message 502 may expire within the context of ephemeral message group 504 based on a group participation parameter 516. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user regardless of whether the receiving user is viewing that ephemeral message 502 inside or outside the context of an ephemeral message group 504.

The messaging system 512 may furthermore operationally remove a particular ephemeral message 502 from the ephemeral message group 504 based on a determination that it has exceeded an associated group participation parameter 516. For example, when a message sender has established a group participation parameter 516 of 24 hours from posting, the messaging system 512 will remove the relevant ephemeral message 502 from the ephemeral message group 504 after the specified 24 hours. The messaging system 512 also operates to remove an ephemeral message group 504 when either the group participation parameter 516 for each and every ephemeral message 502 within the ephemeral message group 504 has expired, or when the ephemeral message group 504 itself has expired in terms of the group duration parameter 514.

In certain use cases, a creator of a particular ephemeral message group 504 may specify an indefinite group duration parameter 514. In this case, the expiration of the group participation parameter 516 for the last remaining ephemeral message 502 within the ephemeral message group 504 will determine when the ephemeral message group 504 itself expires. In this case, a new ephemeral message 502, added to the ephemeral message group 504, with a new group participation parameter 516, effectively extends the life of an ephemeral message group 504 to equal the value of the group participation parameter 516.

Responsive to the messaging system 512 determining that an ephemeral message group 504 has expired (e.g., is no longer accessible), the messaging system 512 communicates with the interaction system 100 (and, for example, specifically the interaction client 104) to cause an indicium (e.g., an icon) associated with the relevant ephemeral message group 504 to no longer be displayed within a user interface of the interaction client 104. Similarly, when the messaging system 512 determines that the message duration parameter 506 for a particular ephemeral message 502 has expired, the messaging system 512 causes the interaction client 104 to no longer display an indicium (e.g., an icon or textual identification) associated with the ephemeral message 502.

System with Head-Wearable Apparatus

Figure 6:
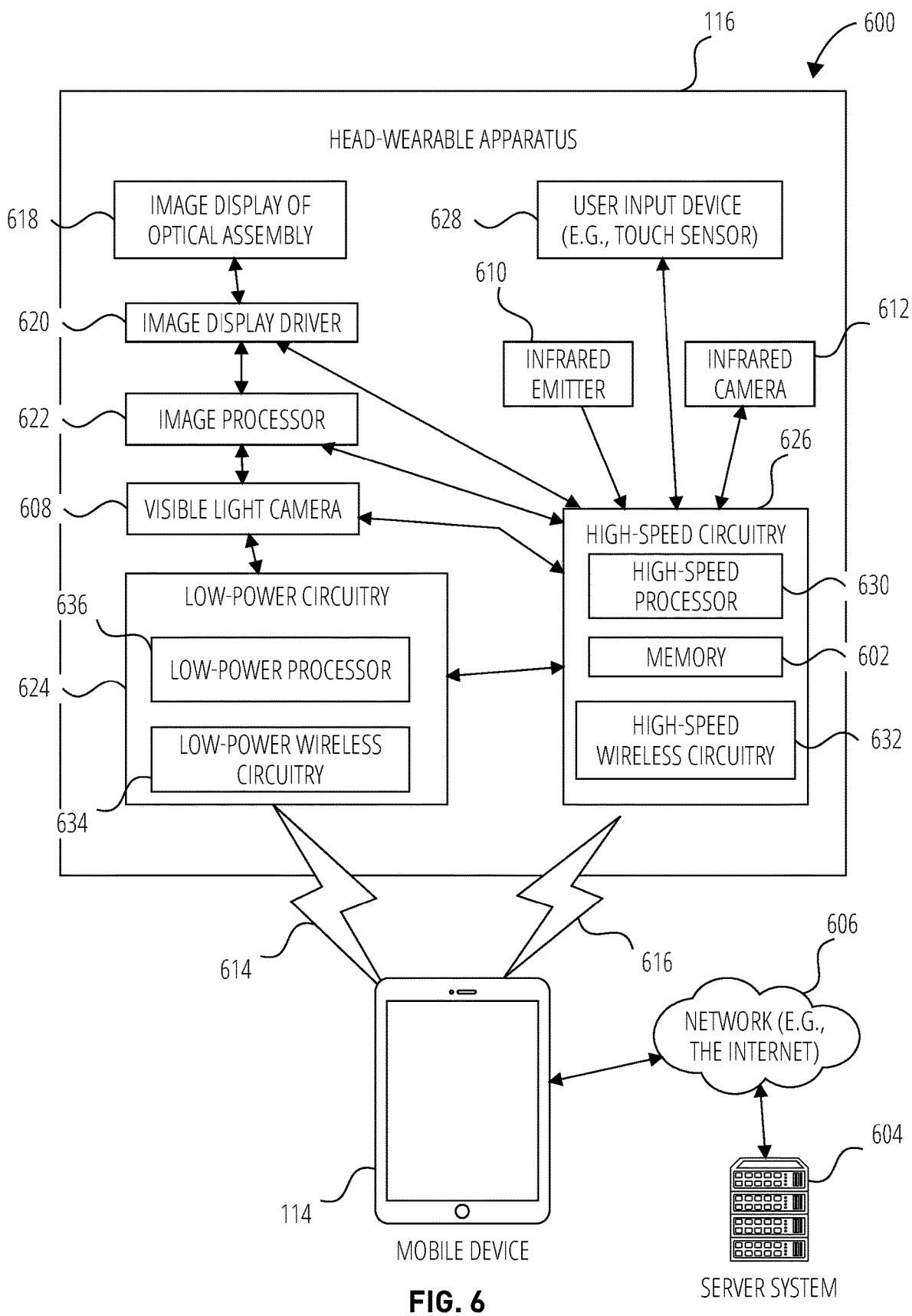
FIG. 6 illustrates a system of a head-wearable apparatus, according to some examples.

FIG. 6 illustrates a system 600 including a head-wearable apparatus 116 with a selector input device, according to some examples. FIG. 6 is a high-level functional block diagram of an example head-wearable apparatus 116 communicatively coupled to a mobile device 114 and various server systems 604 (e.g., the interaction server system 110) via various networks 108.

The head-wearable apparatus 116 includes one or more cameras, each of which may be, for example, a visible light camera 608, an infrared emitter 610, and an infrared camera 612.

The mobile device 114 connects with head-wearable apparatus 116 using both a low-power wireless connection 614 and a high-speed wireless connection 616. The mobile device 114 is also connected to the server system 604 and the network 606.

The head-wearable apparatus 116 further includes two image displays of the image display of optical assembly 618. The two image displays of optical assembly 618 include one associated with the left lateral side and one associated with the right lateral side of the head-wearable apparatus 116. The head-wearable apparatus 116 also includes an image display driver 620, an image processor 622, low-power circuitry 624, and high-speed circuitry 626. The image display of optical assembly 618 is for presenting images and videos, including an image that can include a graphical user interface to a user of the head-wearable apparatus 116.

The image display driver 620 commands and controls the image display of optical assembly 618. The image display driver 620 may deliver image data directly to the image display of optical assembly 618 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 628 (e.g., touch sensor or push button), including an input surface on the head-wearable apparatus 116. The user input device 628 (e.g., touch sensor or push button) is to receive from the user an input selection to manipulate the graphical user interface of the presented image.

The components shown in FIG. 6 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 608 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 602, which stores instructions to perform a subset or all of the functions described herein. The memory 602 can also include storage device.

As shown in FIG. 6, the high-speed circuitry 626 includes a high-speed processor 630, a memory 602, and high-speed wireless circuitry 632. In some examples, the image display driver 620 is coupled to the high-speed circuitry 626 and operated by the high-speed processor 630 in order to drive the left and right image displays of the image display of optical assembly 618. The high-speed processor 630 may be any processor capable of managing high-speed communications and operation of any general computing system needed for the head-wearable apparatus 116. The high-speed processor 630 includes processing resources needed for managing high-speed data transfers on a high-speed wireless connection 616 to a wireless local area network (WLAN) using the high-speed wireless circuitry 632. In certain examples, the high-speed processor 630 executes an operating system such as a LINUX operating system or other such operating system of the head-wearable apparatus 116, and the operating system is stored in the memory 602 for execution. In addition to any other responsibilities, the high-speed processor 630 executing a software architecture for the head-wearable apparatus 116 is used to manage data transfers with high-speed wireless circuitry 632. In certain examples, the high-speed wireless circuitry 632 is configured to implement Institute of Electrical and Electronic Engineers (IEEE) 802.11 communication standards, also referred to herein as WiFi. In some examples, other high-speed communications standards may be implemented by the high-speed wireless circuitry 632.

The low-power wireless circuitry 634 and the high-speed wireless circuitry 632 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 614 and the high-speed wireless connection 616, may be implemented using details of the architecture of the head-wearable apparatus 116, as can other elements of the network 606.

The memory 602 includes any storage device capable of storing various data and applications, including, among other things, camera data generated by the left and right visible light cameras 608, the infrared camera 612, and the image processor 622, as well as images generated for display by the image display driver 620 on the image displays of the image display of optical assembly 618. While the memory 602 is shown as integrated with high-speed circuitry 626, in some examples, the memory 602 may be an independent standalone element of the head-wearable apparatus 116. In certain such examples, electrical routing lines may provide a connection through a chip that includes the high-speed processor 630 from the image processor 622 or the low-power processor 636 to the memory 602. In some examples, the high-speed processor 630 may manage addressing of the memory 602 such that the low-power processor 636 will boot the high-speed processor 630 any time that a read or write operation involving memory 602 is needed.

As shown in FIG. 6, the low-power processor 636 or high-speed processor 630 of the head-wearable apparatus 116 can be coupled to the camera (visible light camera 608, infrared emitter 610, or infrared camera 612), the image display driver 620, the user input device 628 (e.g., touch sensor or push button), and the memory 602.

The head-wearable apparatus 116 is connected to a host computer. For example, the head-wearable apparatus 116 is paired with the mobile device 114 via the high-speed wireless connection 616 or connected to the server system 604 via the network 606. The server system 604 may be one or more computing devices as part of a service or network computing system, for example, that includes a processor, a memory, and network communication interface to communicate over the network 606 with the mobile device 114 and the head-wearable apparatus 116.

The mobile device 114 includes a processor and a network communication interface coupled to the processor. The network communication interface allows for communication over the network 606, low-power wireless connection 614, or high-speed wireless connection 616. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 620. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 604, such as the user input device 628, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 614 and high-speed wireless connection 616 from the mobile device 114 via the low-power wireless circuitry 634 or high-speed wireless circuitry 632.

Figure 7A:
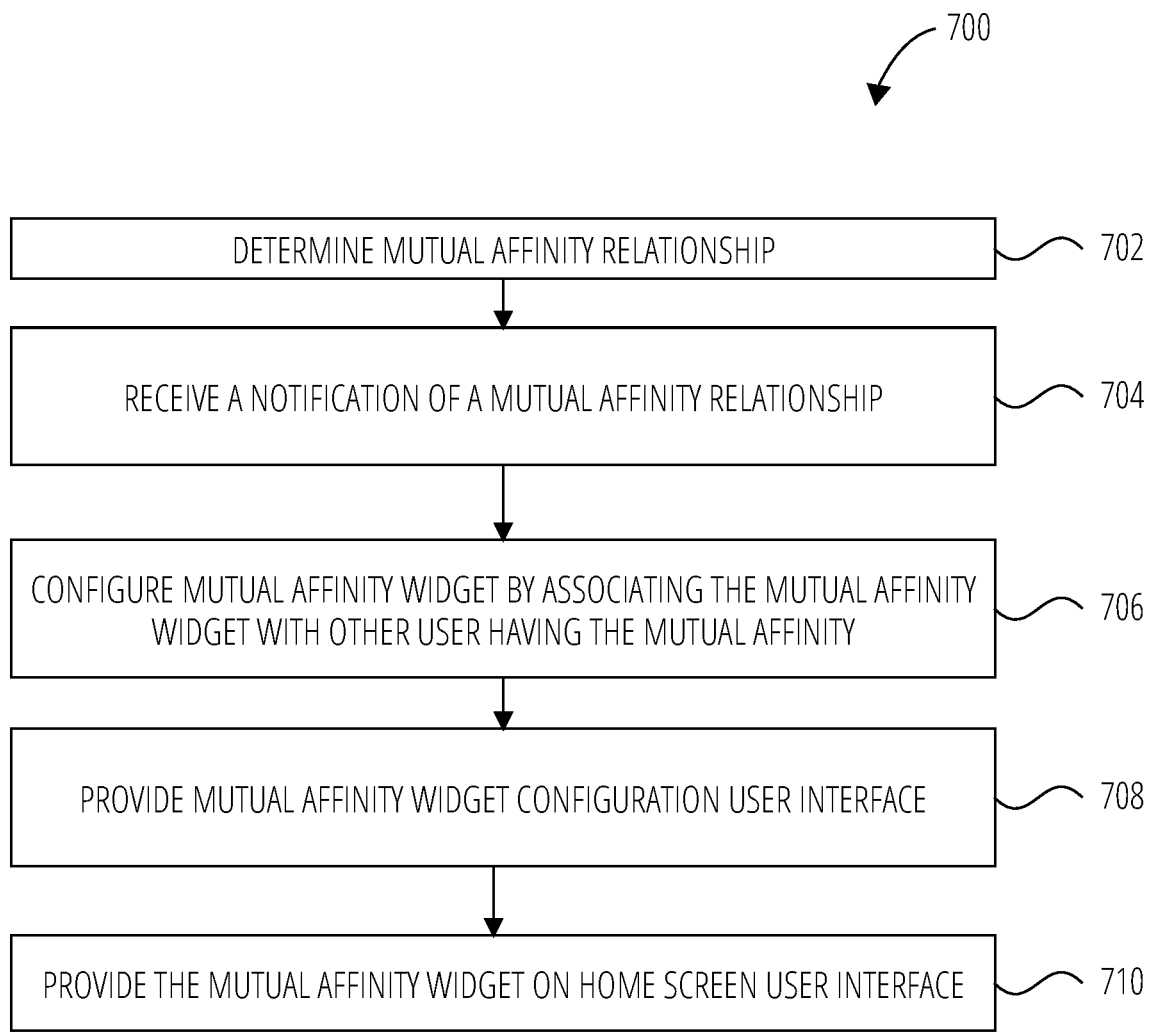
FIG. 7A is a flowchart of a widget configuration method, according to some examples.
Figure 7B:
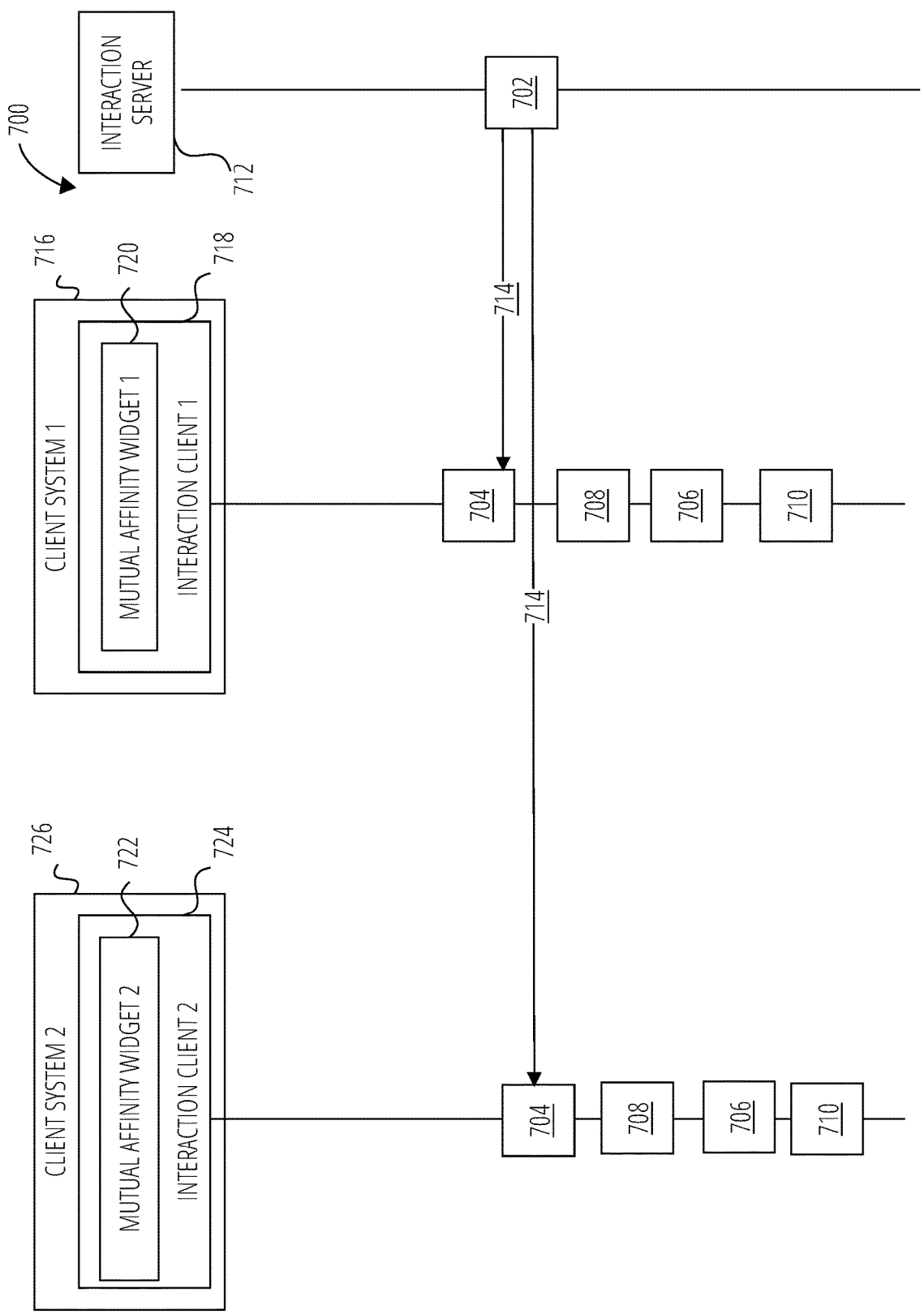
FIG. 7B is a sequence diagram of a widget configuration method, according to some examples.

FIG. 7A is a flowchart of a mutual affinity widget configuration method and FIG. 7B is a sequence diagram of the mutual affinity widget configuration method, and FIG. 8A, FIG. 8B, FIG. 8C, and FIG. 8D illustrate a mutual affinity widget configuration user interface, according to some examples. An interaction client of an interaction system 100, such as interaction client 1 718 and interaction client 2 724, uses the mutual affinity widget configuration method 700 to configure a mutual affinity widget. The interaction client provides the mutual affinity widget configuration user interface to a user to guide the user during a configuration process. The configuration is performed when an interaction server of the interaction system 100, such as interaction server 712, notifies the interaction client that two users share a mutual notable attribute, such as being mutual affinity.

For the purpose of the examples herein, interactions of two users, a message sender (first user) and a message receiver (second user), are disclosed although persons skilled in the art of interaction systems will understand that the methodologies disclosed herein may apply to any number of users.

The message sender (first user) and the message receiver (second user) are users of the interaction system 100 and maintain user accounts with the interaction system 100. The message sender (first user) uses an interaction client 1 718 hosted by client system 1 716 to access the interaction server 712 of the interaction system 100 and, in a like manner. the message receiver (second user) uses interaction client 2 724 hosted by client system 1 726 to access the interaction server 712. The client systems host respective interaction clients 718 and 724. The interaction clients include respective mutual affinity widget components 720 and 722 that are configured based on mutual affinity notification data 714 received from the interaction server 712.

In operation 702, the interaction server 712 determines that the message sender (first user) and the message receiver (second user) have achieved a mutual affinity relationship based on the message sender (first user)'s and message receiver (second user)'s interactions using the interaction system 100. The interaction server 712 uses social network information collected by a social network system 222 of FIG. 2 to determine the mutual affinity relationship between the message sender (first user) and the message receiver (second user). Examples of mutual affinity relationships include, but are not limited to, a first best friends mutual affinity relationship where two or more users are determined to be mutual best friends based on a frequency of their interactions and that they communicate with no other users as much as they do with each other, a common interest or activity mutual affinity relationship where users who have common interests in a particular subject or activity, an organization mutual affinity relationship where users share an affiliation through social clubs or philanthropic organizations, and the like.

In some examples, achievement of a mutual affinity relationship is based on a level of interaction between the message sender (first user) and the message receiver (second user). For example, a determination of an achievement of a mutual affinity relationship is based on matching or exceeding a threshold frequency of interaction between the message sender (first user) and the message receiver (second user). In an additional example, a determination of an achievement of a mutual affinity relationship is based on matching or exceeding a threshold number of interactions between the message sender (first user) and the message receiver (second user). In an additional example, a determination of an achievement of a mutual affinity relationship is based on matching or exceeding a threshold duration of time that the message sender (first user) and the message receiver (second user) have been in a specified mutual affinity relationship.

In some examples, a determination of an achievement of a mutual affinity relationship is based on comparison of a level of interaction between the message sender (first user) and the message receiver (second user) to a level of interaction between the message sender (first user) and/or the message receiver (second user) with other users. For example, the message sender (first user) and the message receiver (second user) may have a "best friends" mutual affinity relationship based on a level of interaction between the message sender (first user) and the message receiver (second user) matching or exceeding a threshold value. While the message sender (first user) and the message receiver (second user) may have other "best friends", a level of interaction between the message sender (first user) with the message receiver (second user} may exceed a level of interaction between the message sender (first user) and any other users, thus determining the message sender (first user) as having a mutual affinity relationship with the message receiver (second user) as the message sender's (first user) "first best friend". In a like manner, a level of interaction between the message receiver (second user) with the message sender (first user} may exceed a level of interaction between the message receiver (second user) and any other users, thus determining the message receiver (second user) as having a mutual affinity relationship with the message sender (first user) as the message receiver's (second user) "first best friend". In an additional example, a mutual affinity relationship is determined by the message sender (first user)

and the message receiver (second user) having a respective mutual affinity relationship, such as, but not limited to being each other's first best friends or "mutual first best friends."

In some examples, the interaction server 712 makes a determination to communicate the mutual affinity notification data 714 in response to detecting that the message sender (first user) and the message receiver (second user) have achieved a mutual affinity relationship.

In some examples, the interaction server 712 makes a determination to communicate the mutual affinity notification data 714 based on an analysis of past interactions of the message sender (first user) and the message receiver (second user) and determining the message sender (first user) and the message receiver (second user) have already achieved a mutual affinity relationship.

The interaction server 712 generates mutual affinity notification data 714 describing the mutual affinity relationship. The mutual affinity notification data 714 includes user identification information identifying the message sender (first user) and the message receiver (second user) that is used to configure the mutual affinity widget 1 720 and the mutual affinity widget 2 722.

Figure 8A:
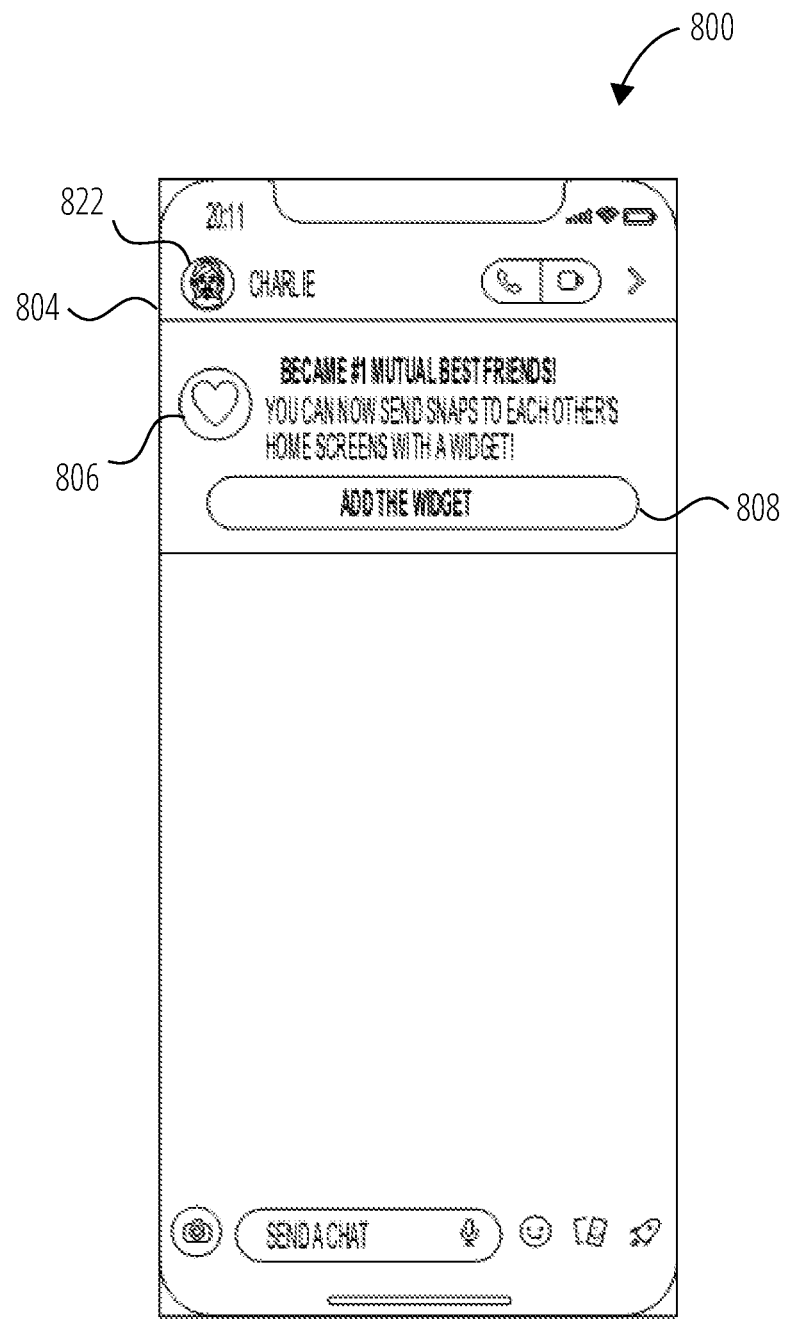
FIG. 8A, FIG. 8B, FIG. 8C, and FIG. 8D are illustrations of a widget configuration method, according to some examples.
Figure 8B:
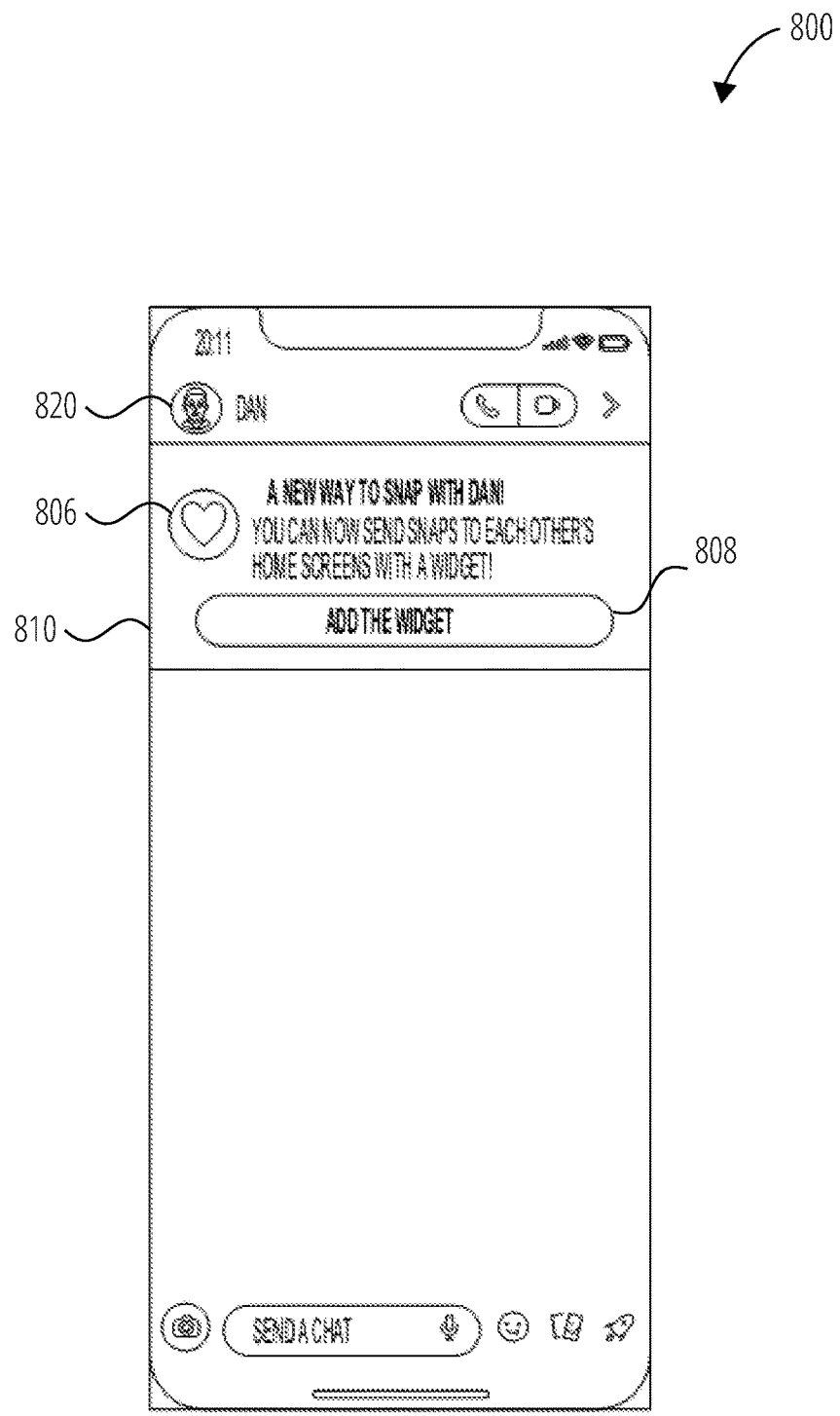

In operation 704, the interaction client 1 718 and the interaction client 2 724 receive the mutual affinity notification data 714 and provide the mutual affinity widget configuration user interface 800 of FIG. 8A to the respective message sender (first user) and message receiver (second user). The mutual affinity widget configuration user interface 800 includes an achievement alert user interface 804 screen or card. The achievement alert user interface 804 includes a user identification 822 and an affinity level indicator 806 indicating a level of mutual affinity achieved between the message sender (first user) and the message receiver (second user). For example, when the mutual affinity is a mutual best friends affinity, the affinity level indicator 806 includes an emoji and tint in the card reflecting the level of friendship (Heart Emoji with shading—Besties if the message sender (first user) and the message receiver (second user) are each other's #1 Best Friend, Heart Emoji—BFF if the message sender (first user) and the message receiver (second user) have been each other's #1 Best Friend for two weeks in a row, and Double Hear Emoji—Super BFF if the message sender (first user) and the message receiver (second user) have been each other's #1 Best friend for two months in a row. In some examples, a user may customize the emoji used. The achievement alert user interface 804 further includes a configuration button 808 that a user selects to configure their respective mutual affinity widget.

In some examples, the interaction server 712 detects that the message sender (first user) and the message receiver (second user) entered a conversation where the message sender (first user) and the message receiver (second user) exchange messages, such as in a chat session or the like. A determination to communicate the mutual affinity notification data 714 to the interaction client 1 718 and the interaction client 2 724 is based on the message sender (first user) and the message receiver (second user) having a mutual affinity relationship and being currently in a conversation. In operation 704, the interaction client 1 718 and interaction client 2 724 receive the mutual affinity notification data 714 and provide another portion of a mutual affinity widget configuration user interface 800 of FIG. 8B to their respective message sender (first user) and message receiver (second user). The mutual affinity widget configuration user interface 800 includes a conversation alert user interface 810 screen or card. The conversation alert user interface 810 includes a user identification 820 and an affinity level indicator 806 indicating a level of mutual affinity achieved between the message sender (first user) and the message receiver (second user). The conversation alert user interface 810 further includes a configuration button 808 that each user selects to configure their respective mutual affinity widget.

Figure 8C:
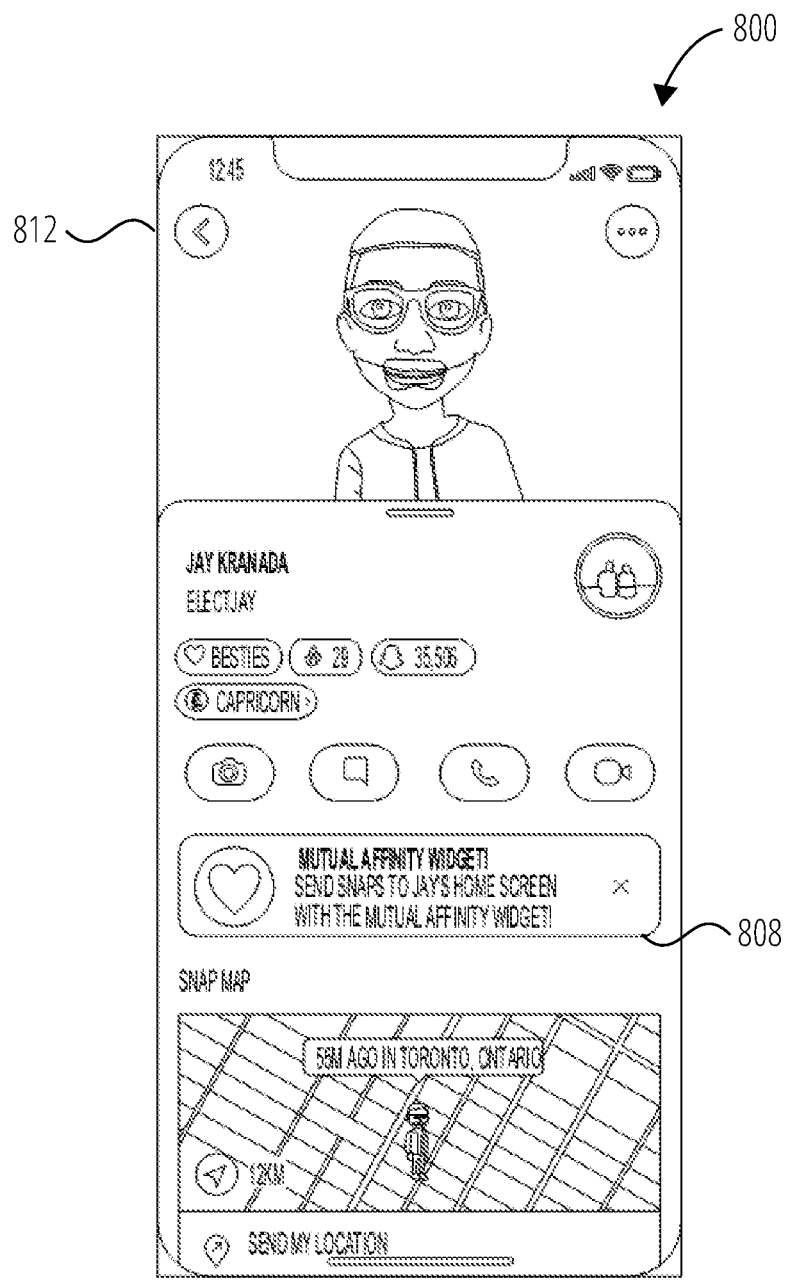

In some examples, the interaction client 1 718 and the interaction client 2 724 provide a portion of the mutual affinity widget configuration user interface 800 of FIG. 8C when a friendship profile user interface 812 is provided to a user. The friendship profile user interface 812 includes a configuration button 808 selectable by a user to configure a mutual affinity widget.

In operation 706, the interaction client 1 718 and the interaction client 2 724 detect selection by a respective message sender (first user) or message receiver (second user) of the configuration button 808 and the interaction client 1 718 and the interaction client 2 724 configure their respective mutual affinity widget 1 720 and mutual affinity widget 2 722 by associating a respective other user with their mutual affinity widget. That is, interaction client 2 724 associates mutual affinity widget 2 722 with the message receiver (second user), and interaction client 1 718 associates mutual affinity widget 1 720 with the message sender (first user).

Figure 8D:
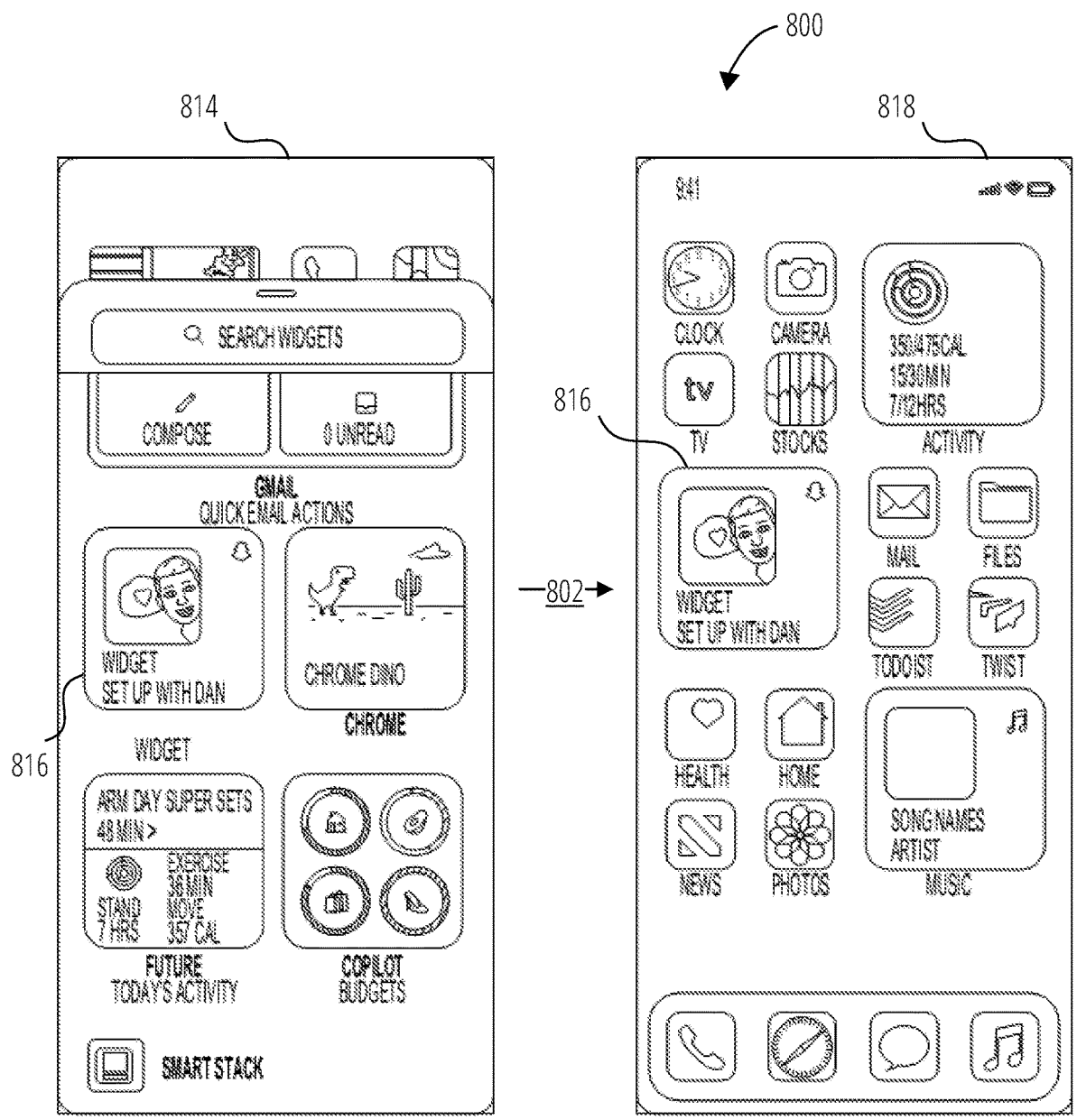

In operation 708, the interaction client 1 718 and the interaction client 2 724 provide another portion of the mutual affinity widget configuration user interface 800 illustrated in FIG. 8D. The users select a mutual affinity widget icon 816 from a widget selection user interface 814 placing 802 the mutual affinity widget icon 816 on a home screen user interface 818 thereby providing the mutual affinity widget icon 816 to the respective message sender (first user) and message receiver (second user) on their respective home screen user interfaces.

In some examples, the respective client systems provide the widget selection user interface 814 as part of a general service of the client systems.

Although the operations of the interaction clients have been disclosed as occurring in concert, either or both interaction clients may operate independently.

Figure 9A:
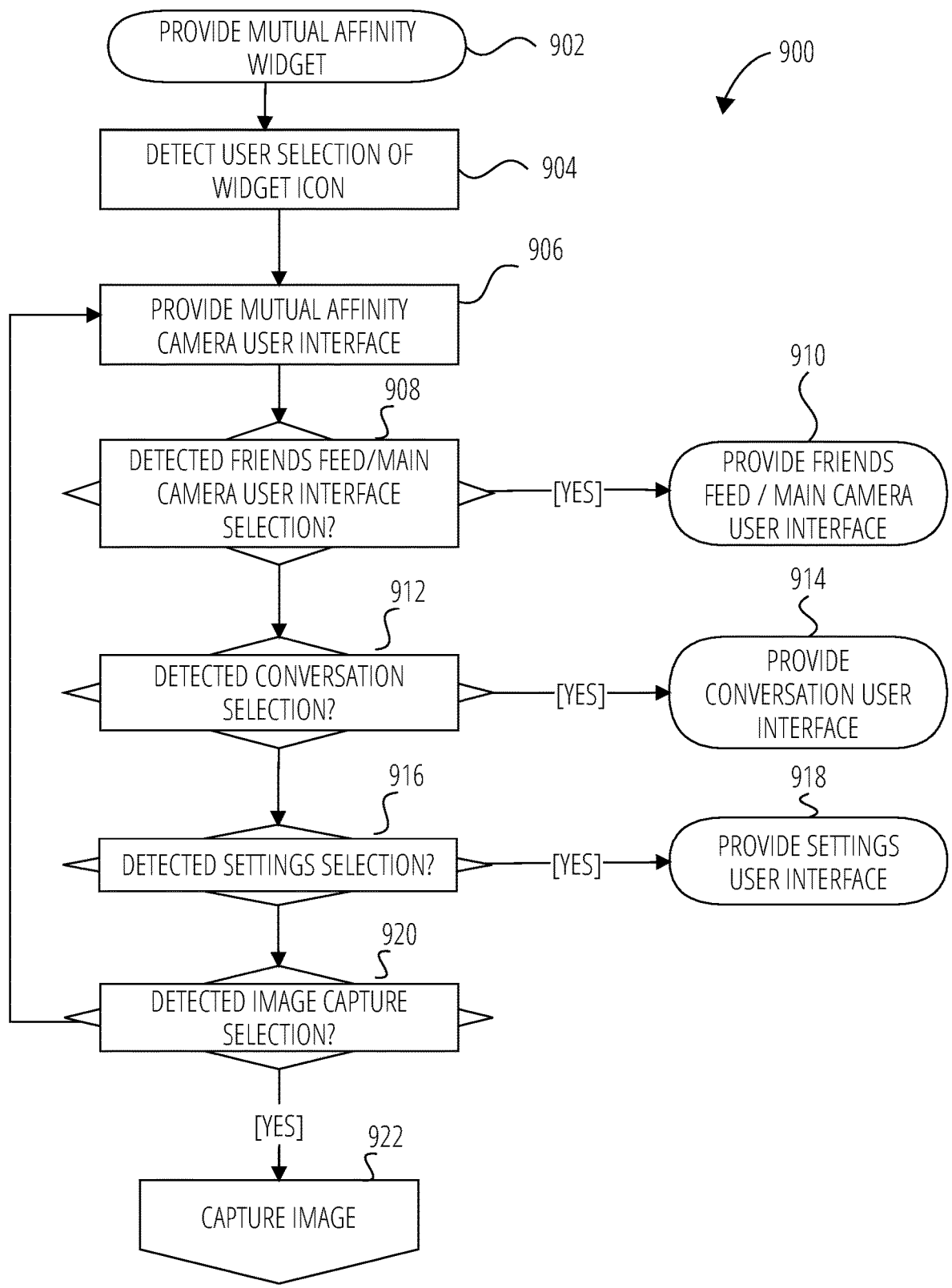
FIG. 9A and FIG. 9B are flowcharts of a create message method, according to some examples.
Figure 9B:
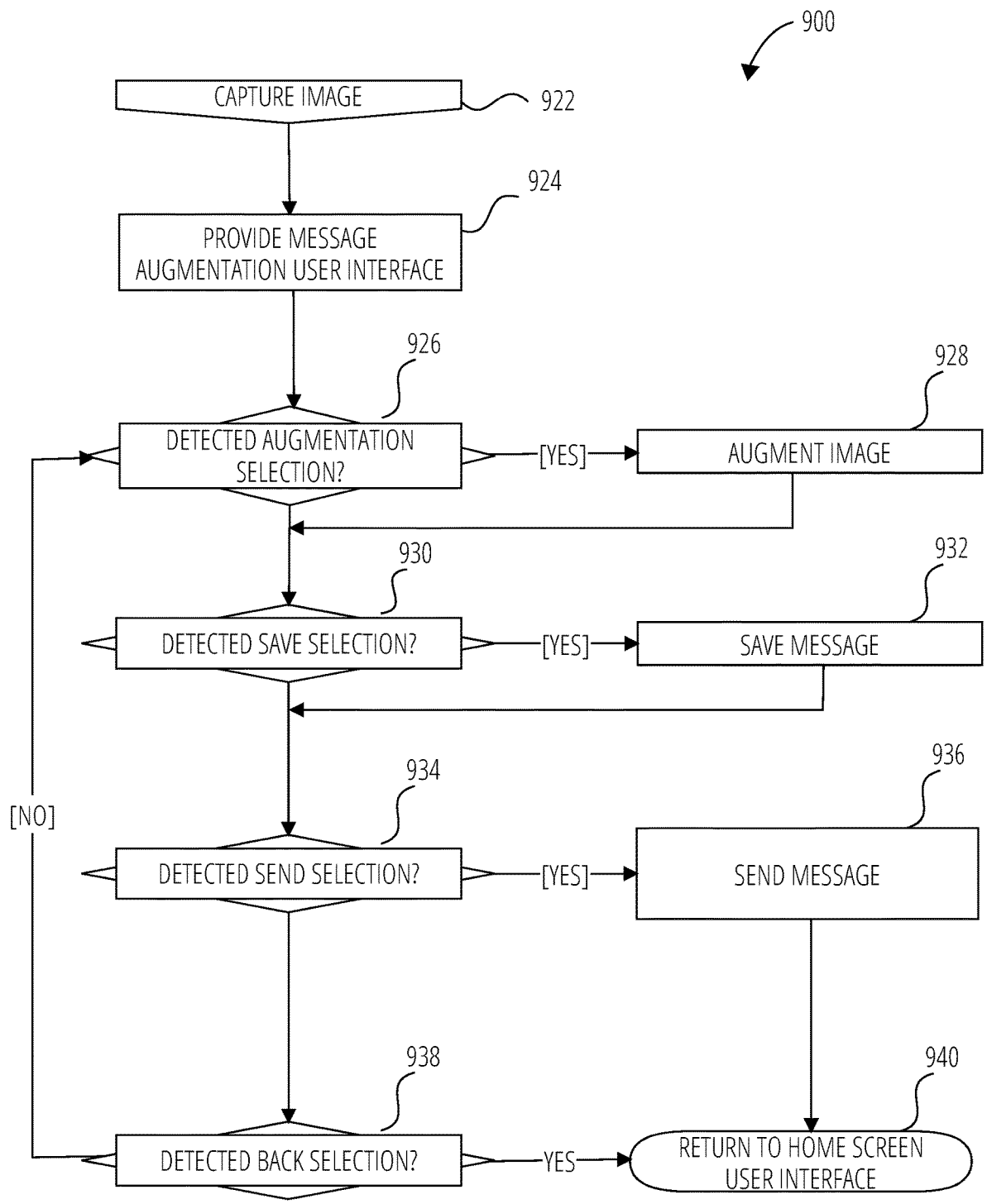
Figure 10A:
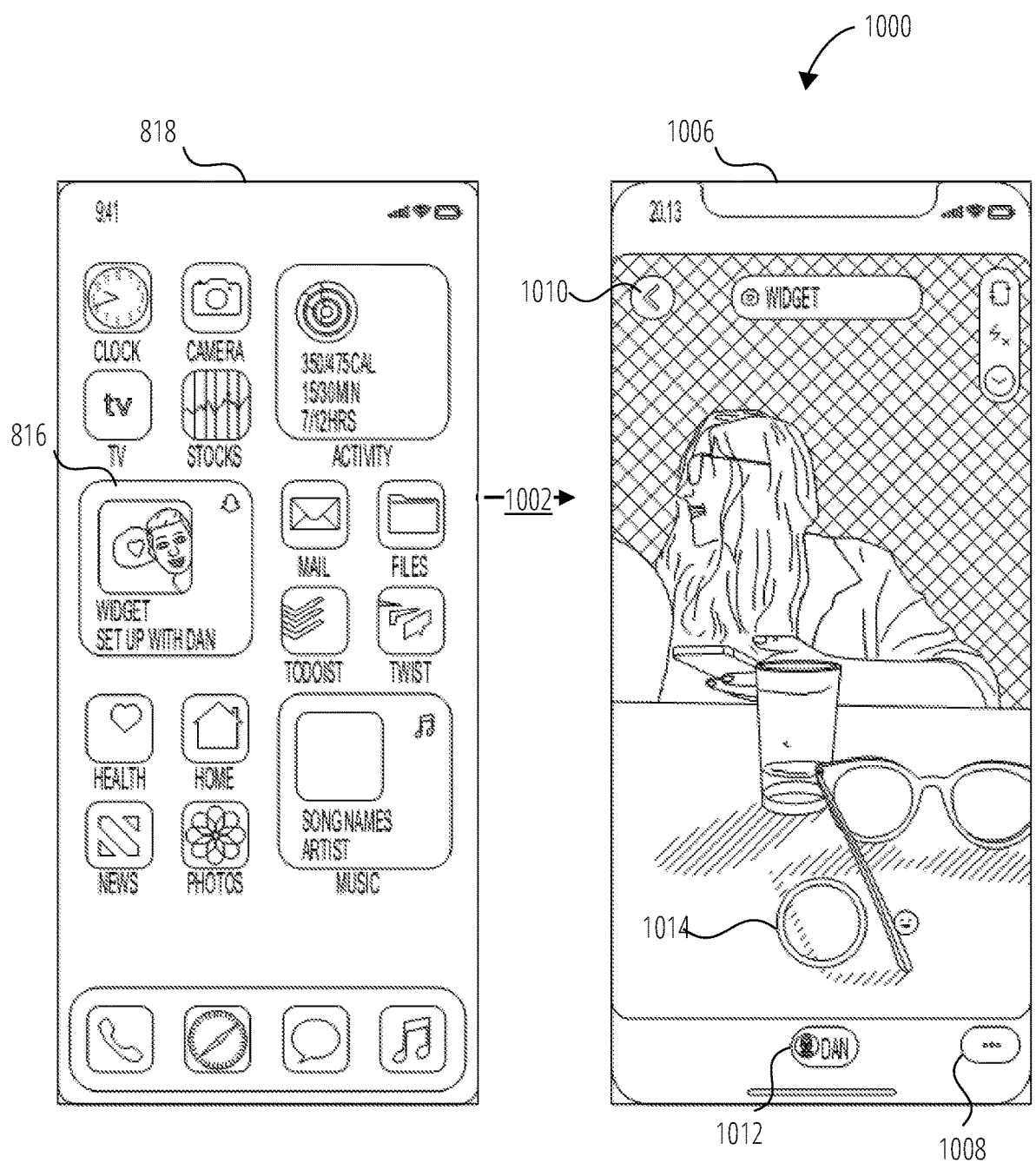
FIG. 10A and FIG. 10B illustrate a create message user interface, according to some examples.
Figure 10B:
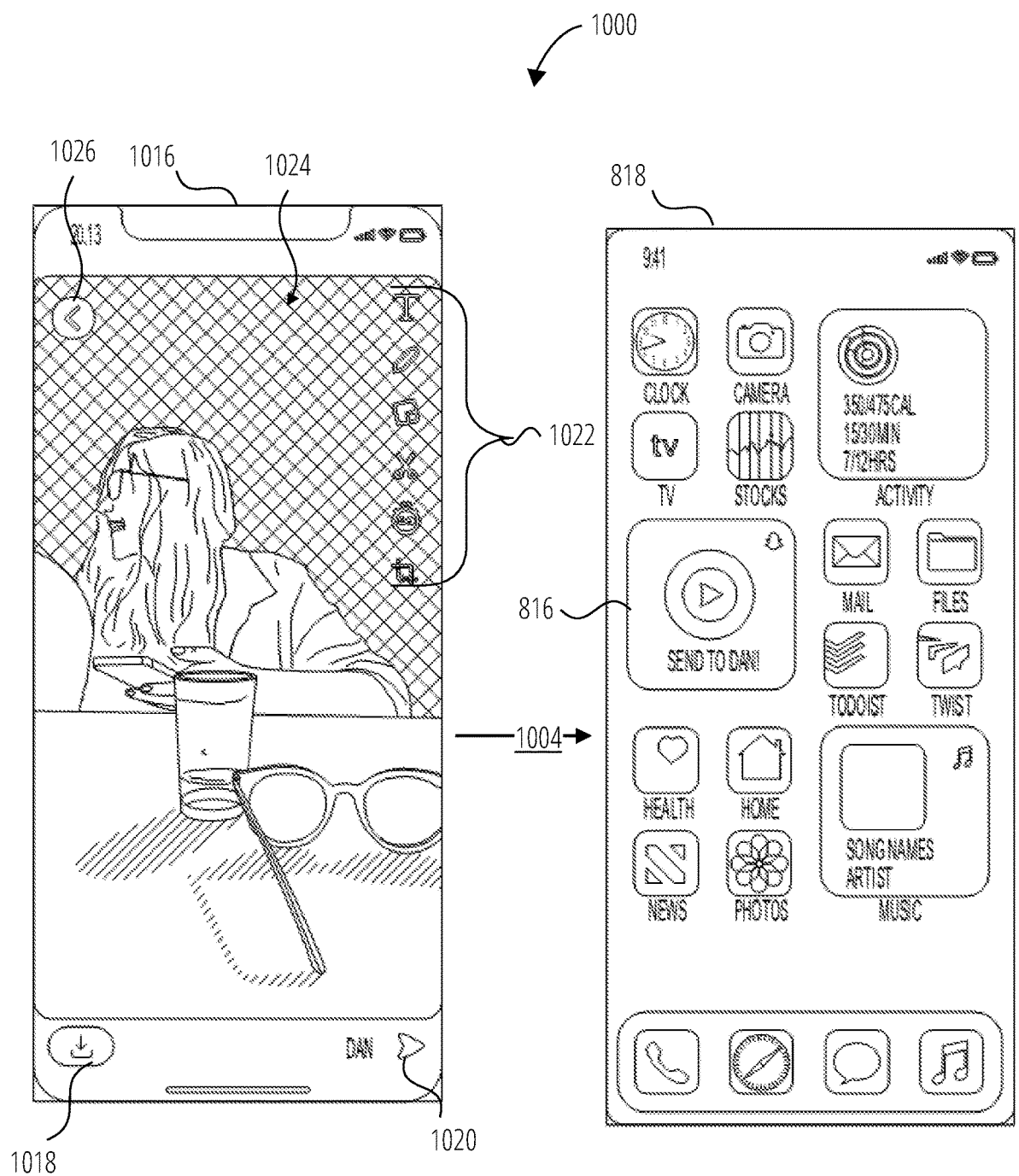

FIG. 9A and FIG. 9B are flowcharts of a create mutual affinity message method and FIG. 9C is a sequence diagram of the create message method, and FIG. 10A and FIG. 10B illustrate a create message user interface, according to some examples. An interaction client 1 718 uses the create mutual affinity message method 900 to provide a create mutual affinity message user interface 1000 to a user so that the user can create and send a mutual entity message to another user in a mutual affinity relationship.

In operation 902, the client system 1 716 of the message sender (first user) provides a home screen user interface 818 having a mutual affinity widget icon 816. The mutual affinity widget icon 816 includes an identification of a mutual affinity user identified during a configuration of the mutual affinity widget 1 720. The message sender (first user) selects the mutual affinity widget icon 816 to directly send a message to, or start a conversation with, the message receiver (second user).

In operation 904 the client system 1 716 detects the message sender (first user) selecting the mutual affinity widget icon 816 and invokes the interaction client 1 718.

In operation 906, the interaction client 1 718 responds 1002 to being invoked by providing a message creation user interface 1006 to the message sender (first user). The message creation user interface 1006 includes selectable icons that the message sender (first user) selects to perform operations to create and send a mutual affinity message.

In operation 908, the interaction client 1 718 detects selection of a back button icon 1010 by the message sender (first user). In response, in operation 910, the interaction client 1 718 terminates the mutual affinity create mutual affinity message method 900 and provides a user interface that includes a camera interface and a feed of messages of other users with whom the message sender (first user) sends and receives messages.

In operation 912, the interaction client 1 718 detects selection of a mutual affinity conversation button icon 1012 by the message sender (first user). In response, in operation 914, the interaction client 1 718 terminates the create mutual affinity message method 900 and provides a conversation user interface that the message sender (first user) may use to start or continue a conversation with a mutual affinity user associated with the mutual affinity widget 1 720.

In operation 916, the interaction client 1 718 detects selection of a settings selection button icon 1008 by the message sender (first user). In response, in operation 918, the interaction client 1 718 terminates the create mutual affinity message method 900 and provides a settings user interface to the message sender (first user) where the message sender (first user) may adjust various settings of the mutual affinity widget 1 720.

In operation 920, the interaction client 1 718 detects selection of a capture image button icon 1014 by the message sender (first user). In response, in operation 922, the interaction client 1 718 uses a camera system 204 of the client system 1 716 to capture image data of one or more images, such as image 1024. The image data is added to a message image payload, such as message image payload 404, of a mutual affinity message 944, such as message 400, that the message sender (first user) sends to the message receiver (second user). In some examples, the image data comprises a still image. In additional examples, the image data comprises video data that is added to a message video payload, such as message video payload 408, of the mutual affinity message 944.

In operation 924, the interaction client 1 718 provides a message editing user interface 1016 to the message sender (first user). The message sender (first user) can use the message editing user interface 1016 to edit and augment the image data of the image 1024 before sending the message to the message receiver (second user).

In operation 926, the interaction client 1 718 detects selection of an augmentation icon from among augmentation icons 1022 by the message sender (first user). In response, in operation 928, the interaction client 1 718 augments the image 1024 by adding message augmentation data, such as message augmentation data 414, based on the selected augmentation icon. For example, the message sender (first user) can add text to the image 1024, erase portions of the image 1024, crop the image 1024, add effects to the image 1024, and the like.

In operation 930, the interaction client 1 718 detects selection of a save message button icon 1018. In response, in operation 932, the interaction client 1 718 saves the image 1024 as a message.

In operation 938, the interaction client 1 718 detects selection of a back button icon 1026 by the message sender (first user). In response, in operation 940, the interaction client 1 718 terminates the create mutual affinity message method 900 and returns to the home screen user interface 818.

In operation 934, the interaction client 1 718 detects selection of a send button icon 1020 by the message sender (first user). In response, in operation 936, the interaction client 1 718 communicates the mutual affinity message 944 created from the image 1024 to the message receiver (second user) via the interaction server 712. The interaction client 1 718 terminates the create mutual affinity message method 900, updates the mutual affinity widget icon 816 to indicate the status of the mutual affinity message 944 as having been sent to the message receiver (second user), and returns 1004 to the home screen user interface 818.

In operation 942, the interaction server 712 receives the mutual affinity message 944 intended for the message receiver (second user).

Figure 11A:
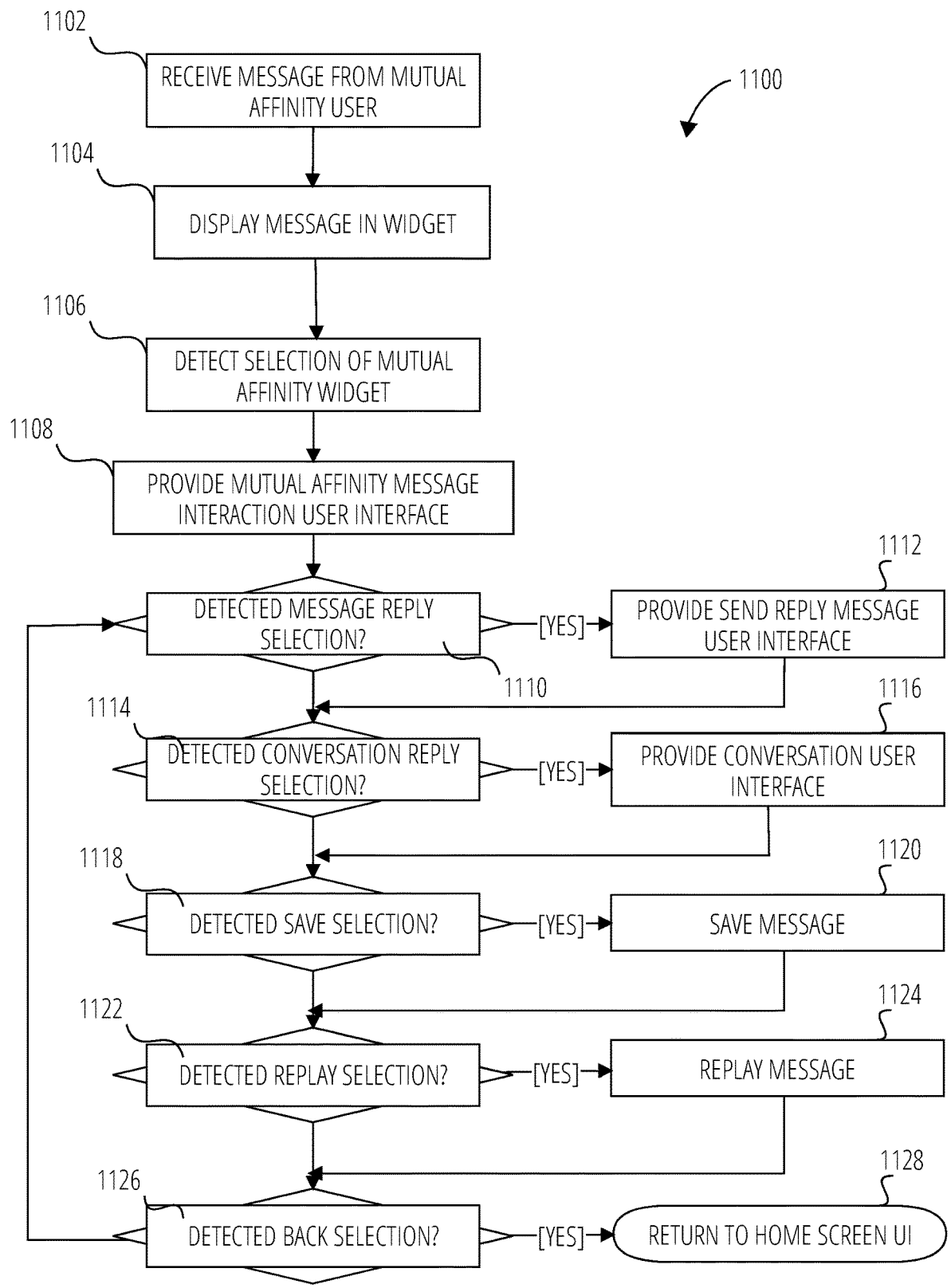
FIG. 11A is a flowchart of a receive message method, according to some examples.
Figure 11B:
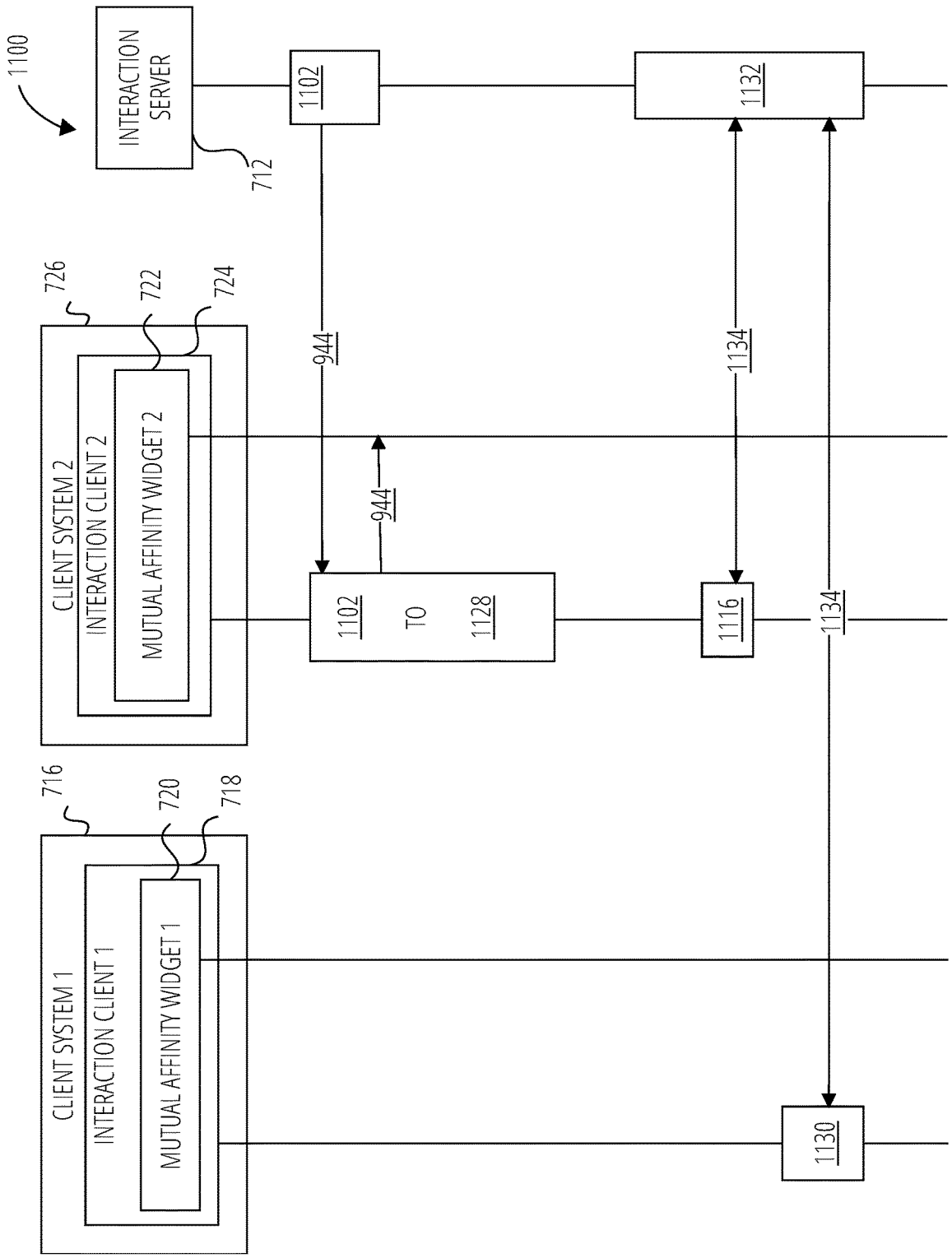
FIG. 11B is a sequence diagram of a receive message method, according to some examples.
Figure 12:
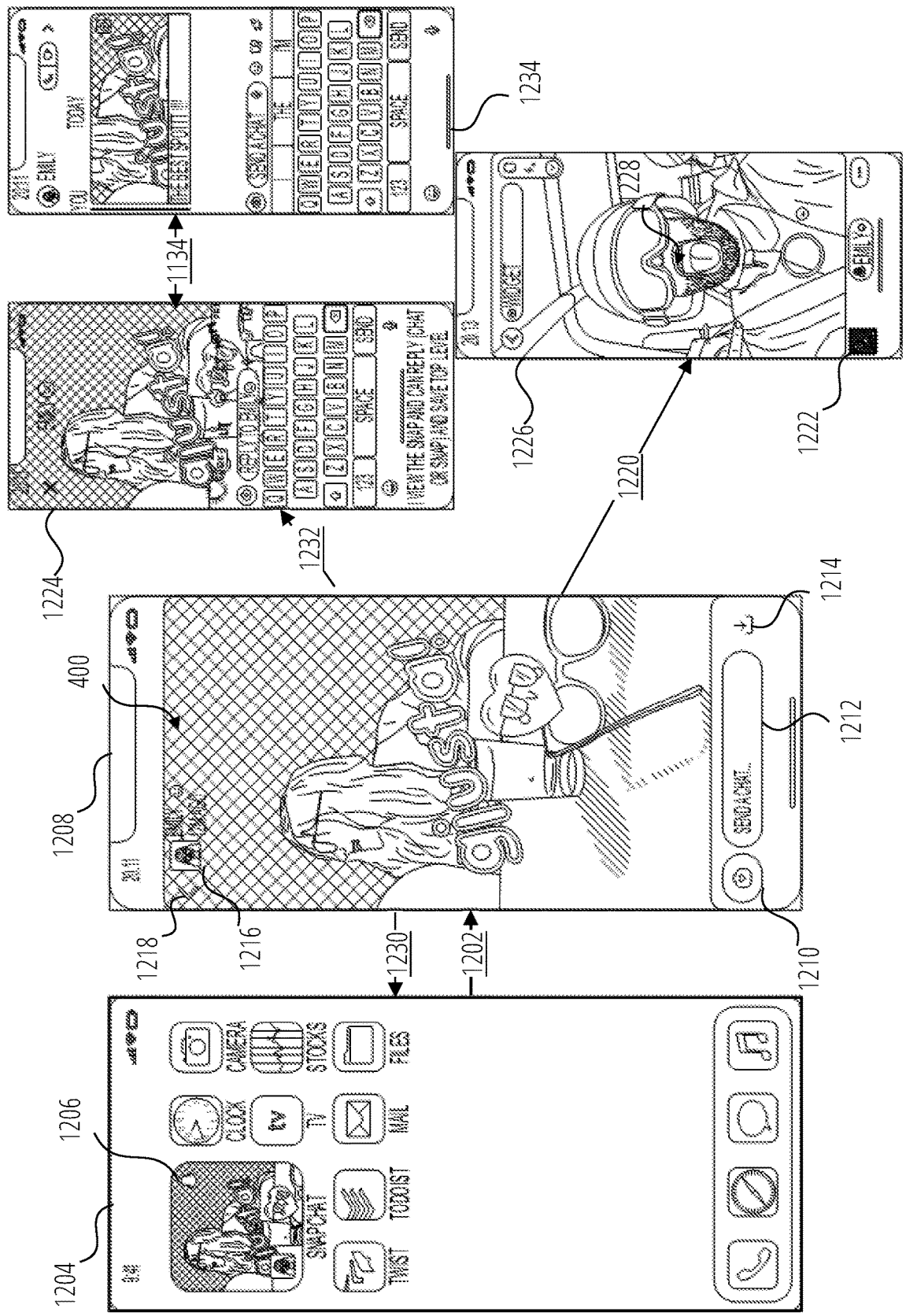
FIG. 12 illustrates a receive mutual affinity message user interface, according to some examples.

FIG. 11A is a flowchart of a receive mutual affinity message method 1100, FIG. 11B is a sequence diagram of the receive mutual affinity message method 1100, and FIG. 12 illustrates a receive mutual affinity message user interface, according to some examples. The interaction client 2 724 hosted by the client system 2 726 uses the receive mutual affinity message method 1100 to provide the mutual affinity message 944 to the message receiver (second user).

In operation 1102, the interaction client 2 724 receives the mutual affinity message 944 communicated from the interaction server 712.

In operation 1104, the interaction client 2 724 provides a portion of the mutual affinity message 944 to the message receiver (second user) as part of a mutual affinity widget icon 1206 provided by the client system 2 726 in a message receiver home screen user interface 1204.

In operation 1106, the interaction client 2 724 detects selection of the mutual affinity widget icon 1206 by the message receiver (second user). In operation 1108, the interaction client 2 724 responds 1202 by providing a message interaction user interface 1208. The message interaction user interface 1208 includes: a display of the mutual affinity message 9440 sent by the message sender (first user); a back button icon 1218 selectable by the message receiver (second user) to close the message interaction user interface 1208 and return to the message receiver home screen user interface 1204; an affinity message sender icon 1216 indicating a sender of the mutual affinity message 944; a message reply button icon 1210 selectable by the message receiver (second user) to reply with another mutual affinity message of their own; a conversation button icon 1212 selectable by the message receiver (second user) that starts a conversation between the message sender (first user) and the message receiver (second user); and a save message button icon 1214 selectable by the message receiver (second user) that saves the mutual affinity message 944.

In operation 1110, the interaction client 2 724 detects selection of the message reply button icon 1210 by the message receiver (second user). In operation 1112, the interaction client 2 724 responds 1220 by providing a mutual affinity reply message user interface 1226 used by the message receiver (second user) to send a reply mutual affinity message 1228 to the message sender (first user).

In operation 1114, the interaction client 2 724 detects selection of the conversation button icon 1212 by the message receiver (second user). In operation 1116, the interaction client 2 724 responds 1232 by providing a mutual affinity message receiver conversation user interface 1224 that the message receiver (second user) can use to start a conversation with the message sender (first user). To do so, the interaction client 2 724 communicates mutual affinity conversation message data 1134 to the interaction server 712. In operation 1132, the interaction server 712 receives the mutual affinity conversation message data 1134 and communicates the mutual affinity conversation message data 1134 to the interaction client 1 718 of the message sender (first user). In operation 1130, the interaction client 1 718 receives the mutual affinity conversation message data 1134 and provides a mutual affinity message sender conversation user interface 1234 to the message sender (first user). Included in the mutual affinity message sender conversation user interface 1234 is a preview of the mutual affinity message 944 sent by the message sender (first user).

In operation 1118, the interaction client 2 724 detects selection of the save message button icon 1214 by the message receiver (second user). In response, in operation 1120, the interaction client 2 724 saves the mutual affinity message 944 to a memory store of the client system 2 726.

In operation 1122, the interaction client 2 724 detects selection by the message receiver (second user) of a replay mutual affinity message button icon 1222 of the mutual affinity reply message user interface 1226. In operation 1124, the interaction client 2 724 responds by replaying the previously sent mutual affinity message 944.

In operation 1126, the interaction client 2 724 detects selection of the back button icon 1218 by the message receiver (second user). In operation 1128, the interaction client 2 724 responds 1230 by terminating the receive mutual affinity message method 1100 and returning to the message receiver home screen user interface 1204.

In some examples, the interaction client 2 724 continues to display a portion of the current mutual affinity message 944 in the mutual affinity widget icon 1206 until the message sender (first user) sends a new mutual affinity message.

In some examples, the mutual affinity message 944 is an ephemeral message and the interaction client 2 724 ceases to make the mutual affinity message 944 available to the message receiver (second user) after a period of time.

Machine Architecture

Figure 13:
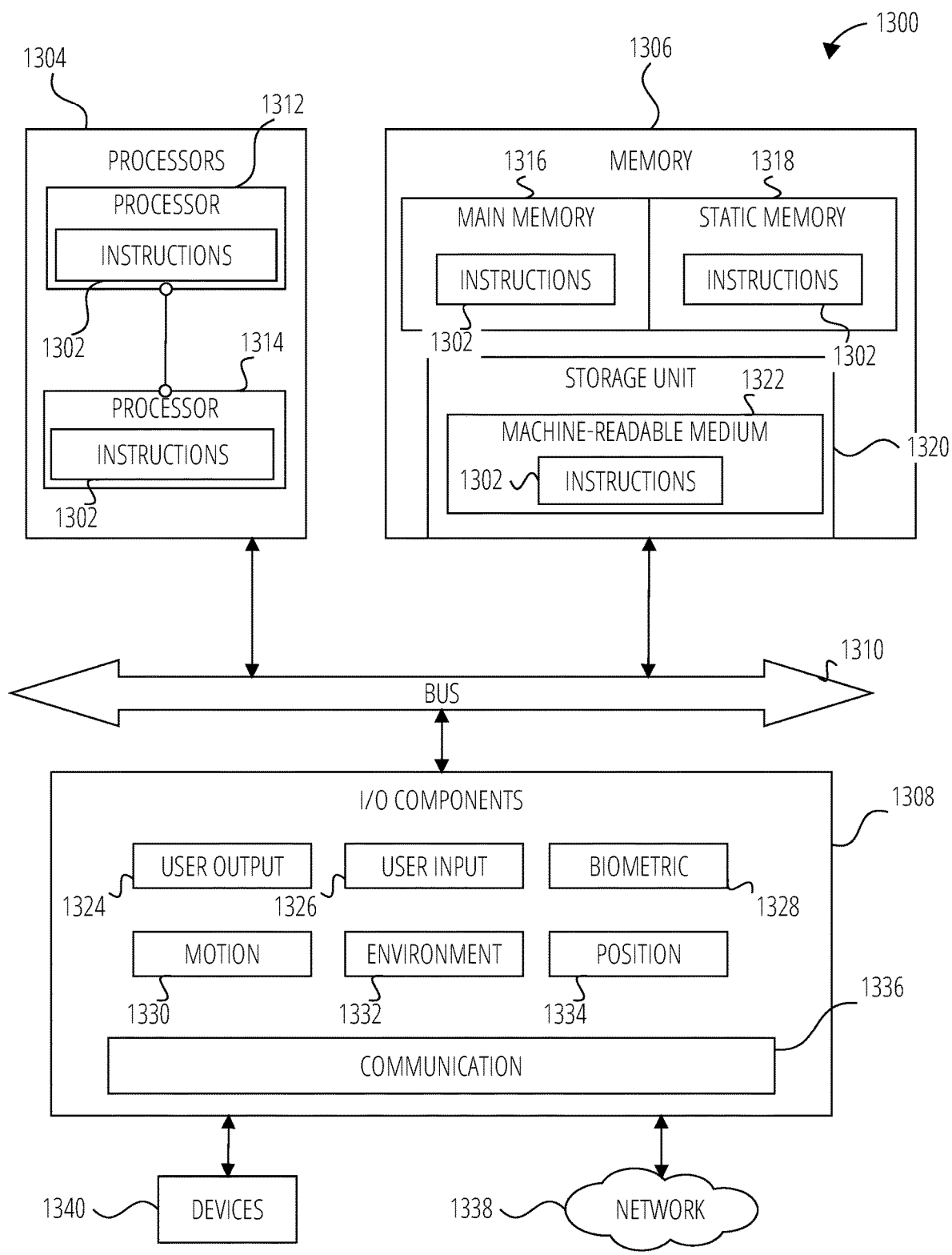
FIG. 13 is a diagrammatic representation of a machine in the form of a computer system within which a set of instructions may be executed to cause the machine to perform any one or more of the methodologies discussed herein, according to some examples.

FIG. 13 is a diagrammatic representation of the machine 1300 within which instructions 1302 (e.g., software, a program, an application, an applet, an app, or other executable code) for causing the machine 1300 to perform any one or more of the methodologies discussed herein may be executed. For example, the instructions 1302 may cause the machine 1300 to execute any one or more of the methods described herein. The instructions 1302 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1302, sequentially or otherwise, that specify actions to be taken by the machine 1300. Further, while a single machine 1300 is illustrated, the term "machine" shall also be taken to include a collection of machines that individually or jointly execute the instructions 1302 to perform any one or more of the methodologies discussed herein. The machine 1300, for example, may comprise the client system 102 or any one of multiple server devices forming part of the interaction server system 110. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1308, which may be configured to communicate with each other via a bus 1310. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1312 and a processor 1314 that execute the instructions 1302. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1316, a static memory 1318, and a storage unit 1320, both accessible to the processors 1304 via the bus 1310. The main memory 1306, the static memory 1318, and storage unit 1320 store the instructions 1302 embodying any one or more of the methodologies or functions described herein. The instructions 1302 may also reside, completely or partially, within the main memory 1316, within the static memory 1318, within machine-readable medium 1322 within the storage unit 1320, within at least one of the processors 1304 (e.g., within the processor's cache memory), or any suitable combination thereof, during execution thereof by the machine 1300.

The I/O components 1308 may include a wide variety of components to receive input, provide output, produce output, transmit information, exchange information, capture measurements, and so on. The specific I/O components 1308 that are included in a particular machine will depend on the type of machine. For example, portable machines such as mobile phones may include a touch input device or other such input mechanisms, while a headless server machine will likely not include such a touch input device. It will be appreciated that the I/O components 1308 may include many other components that are not shown in FIG. 13. In various examples, the I/O components 1308 may include user output components 1324 and user input components 1326. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1308 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1330 include acceleration sensor components (e.g., accelerometer), gravitation sensor components, rotation sensor components (e.g., gyroscope).

The environmental components 1332 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client system 102 may have a camera system comprising, for example, front cameras on a front surface of the client system 102 and rear cameras on a rear surface of the client system 102. The front cameras may, for example, be used to capture still images and video of a user of the client system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client system 102 may also include a 3600 camera for capturing 360° photographs and videos.

Further, the camera system of the client system 102 may include dual rear cameras (e.g., a primary camera as well as a depth-sensing camera), or even triple, quad or penta rear camera configurations on the front and rear sides of the client system 102. These multiple cameras systems may include a wide camera, an ultra-wide camera, a telephoto camera, a macro camera, and a depth sensor, for example.

The position components 1334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1308 further include communication components 1336 operable to couple the machine 1300 to a network 1338 or devices 1340 via respective coupling or connections. For example, the communication components 1336 may include a network interface component or another suitable device to interface with the network 1338. In further examples, the communication components 1336 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1316, static memory 1318, and memory of the processors 1304) and storage unit 1320 may store one or more sets of instructions and data structures (e.g., software) embodying or used by any one or more of the methodologies or functions described herein. These instructions (e.g., the instructions 1302), when executed by processors 1304, cause various operations to implement the disclosed examples.

The instructions 1302 may be transmitted or received over the network 1338, using a transmission medium, via a network interface device (e.g., a network interface component included in the communication components 1336) and using any one of several well-known transfer protocols (e.g., hypertext transfer protocol (HTTP)). Similarly, the instructions 1302 may be transmitted or received using a transmission medium via a coupling (e.g., a peer-to-peer coupling) to the devices 1340.

Software Architecture

Figure 14:
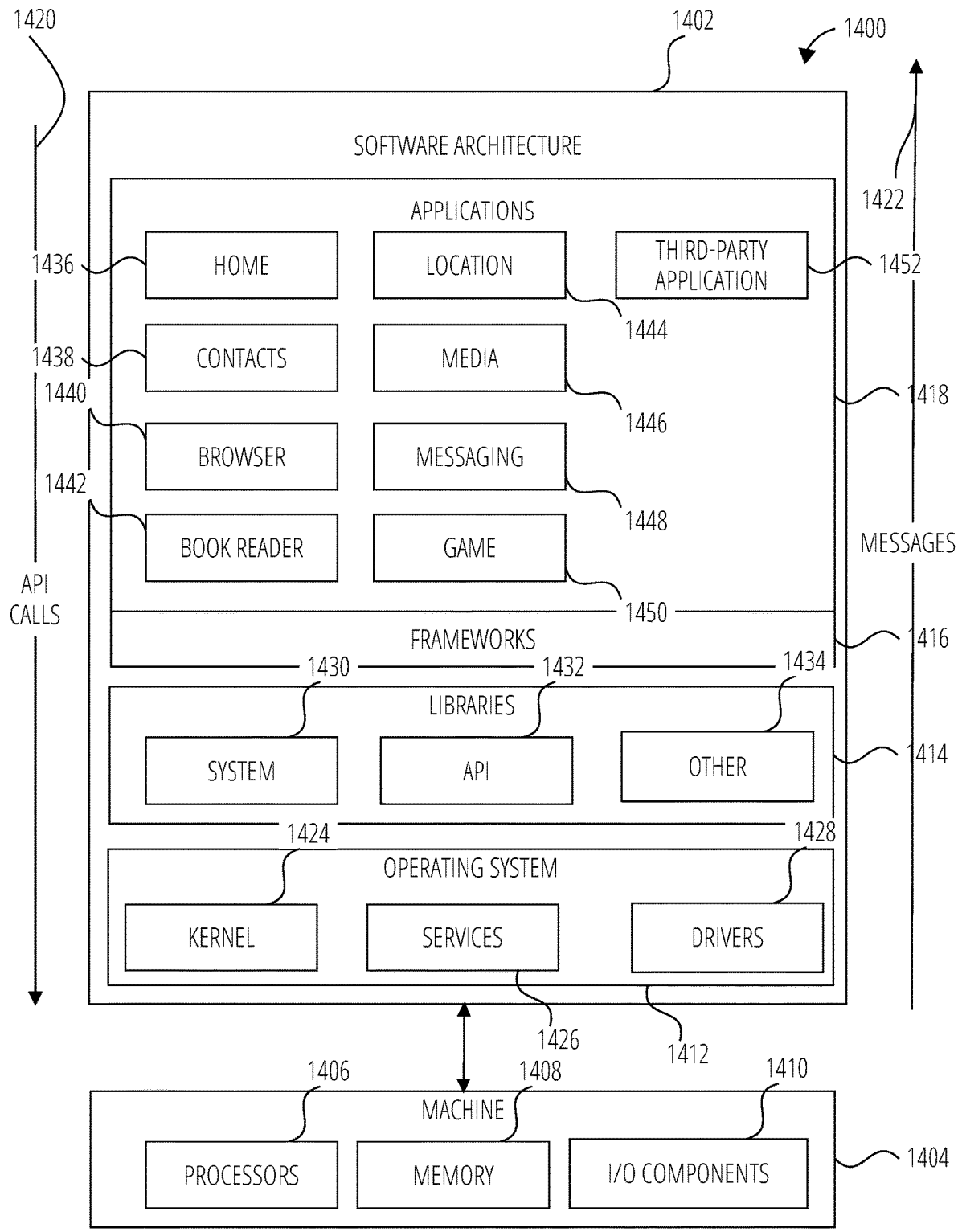
FIG. 14 is a block diagram showing a software architecture within which examples may be implemented.

FIG. 14 is a block diagram 1400 illustrating a software architecture 1402, which can be installed on any one or more of the devices described herein. The software architecture 1402 is supported by hardware such as a machine 1404 that includes processors 1406, memory 1408, and I/O components 1410. In this example, the software architecture 1402 can be conceptualized as a stack of layers, where each layer provides a particular functionality. The software architecture 1402 includes layers such as an operating system 1412, libraries 1414, frameworks 1416, and applications 1418. Operationally, the applications 1418 invoke API calls 1420 through the software stack and receive messages 1422 in response to the API calls 1420.

The operating system 1412 manages hardware resources and provides common services. The operating system 1412 includes, for example, a kernel 1424, services 1426, and drivers 1428. The kernel 1424 acts as an abstraction layer between the hardware and the other software layers. For example, the kernel 1424 provides memory management, processor management (e.g., scheduling), component management, networking, and security settings, among other functionalities. The services 1426 can provide other common services for the other software layers. The drivers 1428 are responsible for controlling or interfacing with the underlying hardware. For instance, the drivers 1428 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1414 provide a common low-level infrastructure used by the applications 1418. The libraries 1414 can include system libraries 1430 (e.g., C standard library) that provide functions such as memory allocation functions, string manipulation functions, mathematic functions, and the like. In addition, the libraries 1414 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1414 can also include a wide variety of other libraries 1434 to provide many other APIs to the applications 1418.

The frameworks 1416 provide a common high-level infrastructure that is used by the applications 1418. For example, the frameworks 1416 provide various graphical user interface (GUI) functions, high-level resource management, and high-level location services. The frameworks 1416 can provide a broad spectrum of other APIs that can be used by the applications 1418, some of which may be specific to a particular operating system or platform.

In an example, the applications 1418 may include a home application 1436, a contacts application 1438, a browser application 1440, a book reader application 1442, a location application 1444, a media application 1446, a messaging application 1448, a game application 1450, and a broad assortment of other applications such as a third-party application 1452. The applications 1418 are programs that execute functions defined in the programs. Various programming languages can be employed to create one or more of the applications 1418, structured in a variety of manners, such as object-oriented programming languages (e.g., Objective-C, Java, or C++) or procedural programming languages (e.g., C or assembly language). In a specific example, the third-party application 1452 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1452 can invoke the API calls 1420 provided by the operating system 1412 to facilitate functionalities described herein.

CONCLUSION

Changes and modifications may be made to the disclosed examples without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A machine comprising:
one or more processors; and
a memory storing instructions that, when executed by the one or more processors, cause the machine to perform operations comprising:
receiving, from a server, a notification of a mutual affinity relationship between a first user and a second user, the mutual affinity relationship determined by:
comparing a level of interaction between the first user and the second user to a level of interaction between at least one of the first user and the second user with one or more other users; and
determining a duration of the mutual affinity relationship matches or exceeds a threshold duration of time;
configuring a mutual affinity widget of an interaction client by associating the mutual affinity widget with the second user;
providing the mutual affinity widget to the first user; and
in response to detecting a selection of the mutual affinity widget by the first user, performing operations comprising:
providing, by the one or more processors, a message creation user interface to the first user;
capturing, by the one or more processors, image data in response to detecting a capture image selection by the first user using the message creation user interface;
generating, by the one or more processors, a first message based on the image data; and
sending, by the one or more processors, the first message to the second user.

2. The machine of claim 1, wherein the server determines the notification based on an achievement of a level of interaction between the first user and the second user.

3. The machine of claim 1, wherein the server communicates the notification of the mutual affinity relationship in response to detecting a conversation between the first user and the second user.

4. The machine of claim 1, wherein the instructions that, when executed by the one or more processors, cause the machine to perform operations of providing the mutual affinity widget to the first user, further cause the machine to perform operations comprising:
providing the mutual affinity widget to the first user on a home screen of a client system of the first user.

5. The machine of claim 1, wherein the instructions that, when executed by the one or more processors, cause the machine to perform operations of generating the first message, further cause the machine to perform operations comprising:
annotating the first message based on annotations selected by the first user using a message editing user interface.

6. The machine of claim 1, wherein the instructions, when executed by the one or more processors, further cause the machine to perform operations comprising:
receiving a second message from a second user via the server; and
displaying, by the one or more processors, a portion of the second message in an icon of the mutual affinity widget.

7. The machine of claim 6, wherein the instructions, when executed by the one or more processors, further cause the machine to perform operations comprising:
providing the second message to the first user in response to detecting selection by the first user of the icon of the mutual affinity widget.

8. A method comprising:
receiving, by one or more processors, from a server, a notification of a mutual affinity relationship between a first user and a second user, the mutual affinity relationship determined by:
comparing a level of interaction between the first user and the second user to a level of interaction between the at least on of the first user and the second user with one or more other users; and
determining a duration of the mutual affinity relationship matches or exceeds a threshold duration of time;
configuring, by the one or more processors, a mutual affinity widget of an interaction client by associating the mutual affinity widget with the second user;
providing, by the one or more processors, the mutual affinity widget to the first user; and
in response to detecting, by the one or more processors, a selection of the mutual affinity widget by the first user, performing operations comprising:
providing, by the one or more processors, a message creation user interface to the first user;
capturing, by the one or more processors, image data in response to detecting a capture image selection by the first user using the message creation user interface;
generating, by the one or more processors, a first message based on the image data; and
sending, by the one or more processors, the first message to the second user.

9. The method of claim 8, wherein the server determines the notification based on an achievement of a level of interaction between the first user and the second user.

10. The method of claim 8, wherein the server communicates the notification of the mutual affinity relationship in response to detecting a conversation between the first user and the second user.

11. The method of claim 8, wherein the mutual affinity widget is provided to the first user on a home screen of a client system of the first user.

12. The method of claim 8, wherein generating the first message further comprises:
annotating the first message based on annotations selected by the first user using a message editing user interface.

13. The method of claim 8, further comprising:
receiving, by the one or more processors, a second message from a second user via the server; and
displaying, by the one or more processors, a portion of the second message in an icon of the mutual affinity widget.

14. The method of claim 13, further comprising:
providing, by the one or more processors, the second message to the first user in response to detecting selection by the first user of the icon of the mutual affinity widget.

15. A non-transitory machine-readable storage medium, the machine-readable storage medium including instructions that, when executed by one or more processors, cause a machine to perform operations comprising:

receiving, by one or more processors, from a server, a notification of a mutual affinity relationship between a first user and a second user, the mutual affinity relationship determined by:
  comparing a level of interaction between the first user and the second user to a level of interaction between at least one of the first user and the second user with one or more other users; and
  determining a duration of the mutual affinity relationship matches or exceeds a threshold duration of time;
configuring, by the one or more processors, a mutual affinity widget of an interaction client by associating the mutual affinity widget with the second user;
providing, by the one or more processors, the mutual affinity widget to the first user; and
in response to detecting, by the one or more processors, a selection of the mutual affinity widget by the first user, performing operations comprising:
  providing, by the one or more processors, a message creation user interface to the first user;
  capturing, by the one or more processors, image data in response to detecting a capture image selection by the first user using the message creation user interface;
  generating, by the one or more processors, a first message based on the image data; and
  sending, by the one or more processors, the first message to the second user.

16. The machine-readable storage medium of claim 15, wherein the server determines the notification based on an achievement of a level of interaction between the first user and the second user.

17. The machine-readable storage medium of claim 15, wherein the server communicates the notification of the mutual affinity relationship in response to detecting a conversation between the first user and the second user.

18. The machine-readable storage medium of claim 15, wherein the instructions that, when executed by the one or more processors, cause the machine to perform operations of providing the mutual affinity widget to the first user, further cause the machine to perform operations comprising:
  providing the mutual affinity widget to the first user on a home screen of a client system of the first user.

19. The machine-readable storage medium of claim 15, wherein the instructions that, when executed by the one or more processors, cause the machine to perform operations of generating the first message, further cause the machine to perform operations comprising:
  annotating the first message based on annotations selected by the first user using a message editing user interface.

20. The machine-readable storage medium of claim 15, wherein the instructions, when executed by the one or more processors, further cause the machine to perform operations comprising:
  receiving a second message from a second user via the server; and
  displaying a portion of the second message in an icon of the mutual affinity widget.

* * * * *